US011713719B2

(12) United States Patent
Mackin et al.

(10) Patent No.: US 11,713,719 B2
(45) Date of Patent: Aug. 1, 2023

(54) ENGINE BLEED POWER RECOVERY SYSTEMS AND RELATED METHODS

(71) Applicant: The Boeing Company, Chicago, IL (US)

(72) Inventors: Steve G. Mackin, Bellevue, WA (US); Joseph Michael Dirusso, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 16/869,250

(22) Filed: May 7, 2020

(65) Prior Publication Data

US 2021/0348564 A1    Nov. 11, 2021

(51) Int. Cl.

| F02C 7/32 | (2006.01) |
|---|---|
| B64D 33/02 | (2006.01) |
| B64D 33/04 | (2006.01) |
| B64D 35/02 | (2006.01) |
| B64D 41/00 | (2006.01) |
| F02C 7/047 | (2006.01) |
| F02C 7/36 | (2006.01) |
| F02C 9/18 | (2006.01) |

(52) U.S. Cl.
CPC ............... *F02C 7/32* (2013.01); *B64D 33/02* (2013.01); *B64D 33/04* (2013.01); *B64D 35/02* (2013.01); *B64D 41/00* (2013.01); *F02C 7/047* (2013.01); *F02C 7/36* (2013.01); *F02C 9/18* (2013.01); *B64D 2033/0213* (2013.01)

(58) Field of Classification Search
CPC ..... F02C 6/14; F02C 7/36; F02C 9/18; B64D 33/02; B64D 33/04
See application file for complete search history.

(56) References Cited

U.S. PATENT DOCUMENTS

| 8,063,501 | B2* | 11/2011 | Finney | H02K 16/005 |
|---|---|---|---|---|
| | | | | 290/52 |
| 9,624,831 | B2* | 4/2017 | Brousseau | F02K 3/115 |
| 10,914,234 | B1* | 2/2021 | O'Flarity | F02C 6/08 |
| 2005/0103931 | A1* | 5/2005 | Morris | F02C 9/18 |
| | | | | 244/58 |
| 2006/0010875 | A1* | 1/2006 | Mahoney | F02C 3/13 |
| | | | | 60/802 |

(Continued)

FOREIGN PATENT DOCUMENTS

EP    3783212    2/2021

OTHER PUBLICATIONS

European Patent Office, "Extended European Search Report," issued in connection with European Patent Application No. 21160067.1, dated Aug. 6, 2021, 9 pages.

*Primary Examiner* — Michael H Wang
(74) *Attorney, Agent, or Firm* — Hanley, Flight & Zimmerman, LLC

(57) ABSTRACT

Engine bleed air power recovery systems and related methods are disclosed. An example power recovery system for an aircraft engine includes a power recovery turbine coupled to aa shaft-driven device. A bleed air valve coupled between the power recovery turbine and a bleed air source. A controller configured to operate the bleed air valve to allow bleed air to flow to the power recovery turbine when the aircraft engine operates in a predetermined mode of operation.

19 Claims, 15 Drawing Sheets

(56) References Cited

U.S. PATENT DOCUMENTS

| | | | |
|---|---|---|---|
| 2007/0017226 A1* | 1/2007 | Butt | F02C 7/36 |
| | | | 60/802 |
| 2007/0175223 A1* | 8/2007 | Balan | B64D 41/00 |
| | | | 60/783 |
| 2007/0234731 A1* | 10/2007 | Sheldon | B64D 41/00 |
| | | | 60/802 |
| 2008/0245050 A1* | 10/2008 | Wollenweber | F02C 9/28 |
| | | | 60/39.15 |
| 2009/0000305 A1* | 1/2009 | Porte | F02K 3/075 |
| | | | 60/782 |
| 2010/0232935 A1* | 9/2010 | Twell | F04D 29/563 |
| | | | 415/151 |
| 2010/0314877 A1* | 12/2010 | Finney | F01D 15/10 |
| | | | 60/785 |
| 2014/0083106 A1* | 3/2014 | Mackin | B64D 13/08 |
| | | | 60/785 |
| 2018/0058333 A1* | 3/2018 | Foutch | F02C 9/18 |
| 2018/0134397 A1* | 5/2018 | Himmelmann | B64D 13/08 |

* cited by examiner

ENGINE BLEED POWER RECOVERY SYSTEMS AND RELATED METHODS

FIELD

The present disclosure relates generally to aircraft and, more particularly, to engine bleed power recovery systems and related methods.

BACKGROUND

Commercial aircraft typically extract bleed air from a compressor of an aircraft engine to provide pressurized air for various aircraft systems. For example, commercial aircraft often employ bleed air to provide air supply for an environmental control system to pressurize a passenger cabin of the aircraft and/or thermal anti-icing systems to provide heated air for anti-icing applications.

SUMMARY

An example power recovery system for an aircraft engine includes a power recovery turbine coupled to a shaft-driven device. A bleed air valve is coupled between the power recovery turbine and a bleed air source. A controller is configured to operate the bleed air valve to allow bleed air to flow to the power recovery turbine when the aircraft engine operates in a predetermined mode of operation.

Another example power recovery system includes a power recovery system includes a power recovery turbine having: a bleed air inlet to receive bleed air from a bleed air source; a bleed air outlet to provide the bleed air to a downstream system; and an output shaft operatively coupled to an input shaft of a shaft-driven device. The power recovery turbine to generate power in response to processing the bleed air as the bleed air flows from the bleed air inlet to the bleed air outlet, the power recovery turbine to transfer the generated power to the input shaft via the output shaft.

An example aircraft includes an aircraft engine having a core compressor to generate compressed air and a core turbine to drive the core compressor. A power recovery turbine is operatively coupled to the aircraft engine. The power recovery turbine has a turbine inlet in fluid communication with a bleed air supply source provided by the core compressor and a turbine outlet in fluid communication with a downstream system of the aircraft. The power recovery turbine to generate power when processing bleed air from the turbine inlet to the turbine outlet and transfer the generated power to the core compressor of the aircraft engine.

The features, functions and advantages that have been discussed can be achieved independently in various embodiments or may be combined in yet other embodiments further details of which can be seen with reference to the following description and drawings.

Figure 1:
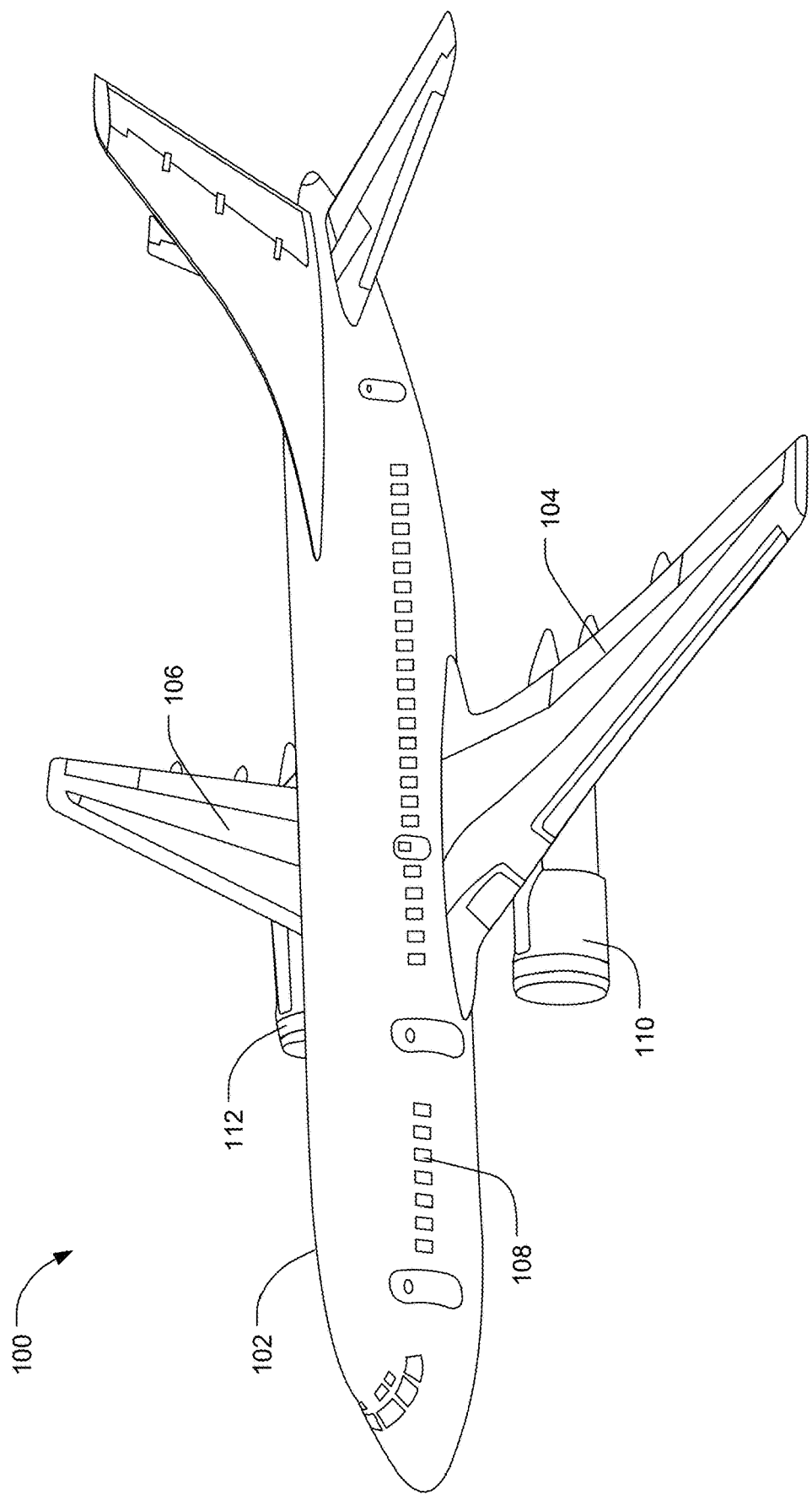
FIG. 1 is an illustration of an example aircraft that includes an example bleed air system having an example power recovery system constructed in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Bleed air pressures vary greatly with operating conditions of an aircraft such as, for example, engine speed, operating altitude, etc. To meet the pressure and/or temperature demands of the various aircraft systems, bleed air is often extracted from a stage of the compressor that provides bleed air having a pressure and/or temperature above that demanded by the various systems utilizing the bleed air. Thus, the pressurized bleed air is then often cooled, via a heat exchanger or precooler, and reduced in pressure, via a pressure regulating valve, prior to providing the bleed air to a system (e.g., an environmental control system) of the aircraft. Thus, existing aircraft bleed air systems utilize pressure regulating valves and heat exchangers to reduce bleed air to allowable pressures and temperatures compatible with the systems to which it is provided. Regulating valves are effective to limit bleed air pressure but recover no energy from the bleed air. Therefore, much of the energy spent by the engine to produce the bleed air is wasted when cooling the bleed air and/or reducing the pressure of the bleed air for the various systems and, thus, extracting bleed air in such a manner can reduce the efficiency of the engine. This wasted energy results in greater fuel consumption.

Example engine bleed power recovery systems and related methods disclosed herein provide compressed or pressurized air to the various systems of an aircraft such as, for example, an environmental control system (ECS), a thermal anti-icing system (e.g., a wing and/or engine anti-icing system), a pneumatic supply system (to supply pneumatic devices), and/or any other system of the aircraft that requires use of compressed air.

Specifically, example bleed air recovery systems and related methods disclosed herein harvest energy from the extracted engine bleed air. Example bleed air recovery systems and related methods disclosed herein convert the harvested energy in the bleed air into shaft horsepower that is fed back into an aircraft engine (e.g., a jet engine high spool shaft). When active, example bleed air recovery systems and related methods disclosed herein can be used to supplement power generated by a core gas turbine engine (e.g., an aircraft engine) of the aircraft. The energy recovered improves the fuel efficiency of the aircraft engine while also increasing the available thrust.

To harvest the energy from the bleed air, the bleed air recovery systems and related methods disclosed herein employ a turbine that receives bleed air from the engine aircraft prior to providing the bleed air to downstream systems (e.g., a precooler, an ECS, etc.). For example, example bleed air recovery systems and related methods disclosed herein can extract bleed air used to drive the turbine (e.g., a power recovery turbine) during operation of the aircraft engine. The example turbine disclosed herein reduces one or more parameters (e.g., a pressure, a temperature, etc.) of the bleed air prior to providing the bleed air to downstream system(s).

In some examples, example bleed air recovery systems and related methods disclosed herein can be employed during a predetermined mode of operation (e.g., taxiing, takeoff, climb, cruise, landing, etc.) of an aircraft. In some examples, to activate and/or deactivate an example turbine, example bleed air recovery systems and related methods disclosed herein can include an example control system to control flow of bleed air to the turbine. The example control system disclosed herein includes a bleed air valve coupled between a bleed air source and the turbine and a controller (e.g., communicatively and/or operatively) coupled to the bleed air valve. The control system, via for example the controller, can be configured to operate the bleed air valve to channel or direct bleed air from the bleed air supply source to the turbine during a predetermined mode of operation (e.g., takeoff, climb, descent, landing, cruise, etc.).

In some examples, example bleed air recovery systems and related methods disclosed herein can be used to start an aircraft engine. Thus, in some instances, a starter of the aircraft engine can be replaced by the example bleed air recovery systems and related methods disclosed herein. Specifically, the example turbine can be used to start (e.g., rotate) the aircraft engine. For example, the turbine (e.g., a pneumatic starter turbine) can be configured to create a starting torque sufficient to start the aircraft engine.

FIG. 1 illustrates an example aircraft 100 that embodies aspects of the teachings of this disclosure. The aircraft 100 includes a fuselage 102, a first wing 104 coupled to the fuselage 102, and a second wing 106 coupled to the fuselage 102. The fuselage 102 defines a cabin 108 where the passengers and/or cargo are carried. In the illustrated example, the aircraft 100 includes an aircraft engine 110 carried by the wing 104 and an aircraft engine 112 carried by the second wing 106. In other examples, the aircraft 100 may include only one engine or may include more than two engines. The engine(s) can be carried on the wings 104, 106 and/or another structure on the aircraft 100 (e.g., on the tail section of the fuselage 102).

Figure 2:
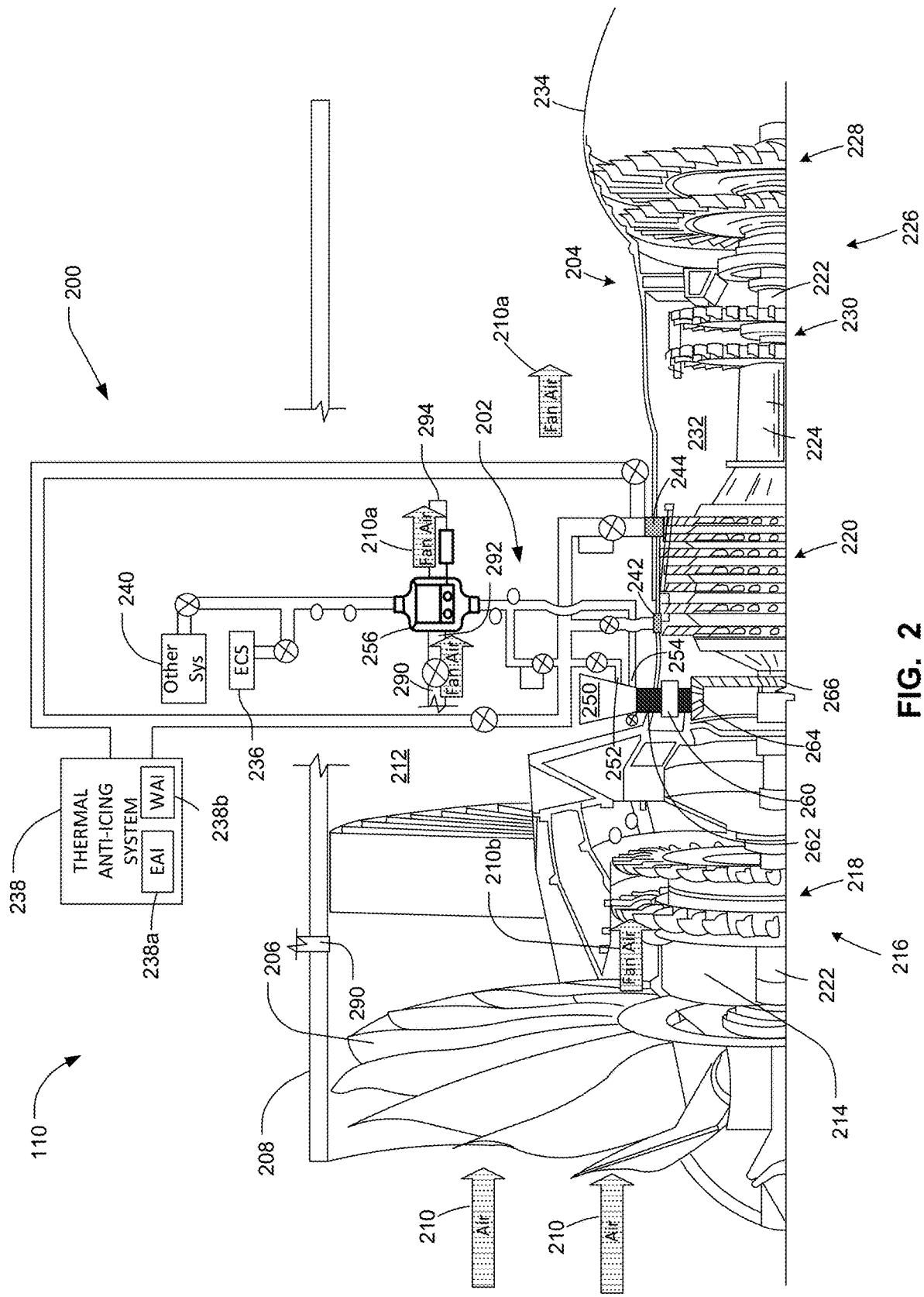
FIG. 2 is a schematic illustration an example aircraft engine having an example power recovery system disclosed herein.

FIG. 2 is a partial cutaway view of the aircraft engine 110 of FIG. 1. The aircraft engine 110 has an example bleed air system 200 that includes a power recovery system 202 in accordance with the teachings of this disclosure. The power recovery system 202 is configured to recover energy from bleed air and convert the recovered energy to power (e.g., horsepower) that is transferred to the aircraft engine 110. The energy recovered by the power recovery system 202 improves the fuel efficiency of the aircraft engine 110 while also increasing thrust. In some examples, the energy extracted by the power recovery system 202 can be employed to operate (e.g., drive) an auxiliary system (e.g., a generator that produces electricity for auxiliary systems or equipment such as, for example, a pump).

The power recovery system 202 of FIG. 2 is shown as being implemented in connection with the aircraft engine 110 (shown in a partial cutaway view) of the aircraft 100 (FIG. 1). A system similar to bleed air system 200 and/or the power recovery system 202 can be implemented in connection with the aircraft engine 112 (FIG. 1). Thus, in some examples, each of the aircraft engines 110, 112 includes the power recovery system 202. In some examples, each of the aircraft engines 110, 112 employs a dedicated power recovery system 202. This configuration enables the power recovery system 202 of each of the aircraft engines 110, 112 to work together to meet the supply air demands of the aircraft systems (e.g., an ECS, Auxiliary pneumatic systems, etc.) and/or provide redundancy. In some examples, only one of the aircraft engines 110, 112 includes the power recovery system 202 disclosed herein. For brevity, only one aircraft engine 110 is described in detail.

Referring to FIG. 2, the aircraft engine 110 is a turbofan engine having an engine core 204 (sometimes referred to as a gas turbine engine) and a fan 206. The engine core 204 drives the fan 206 to produce thrust. The fan 206 rotates within a nacelle 208 of the aircraft engine 110. As the fan 206 rotates, the fan 206 produces airflow 210. A fan air 210a portion of the airflow 210 flows through a fan bypass 212 (e.g., a duct, a passageway, a channel, a nozzle duct, etc.) that bypasses the engine core 204 and another portion 210b of the airflow 210 is also provided to the engine core 204 for combustion.

The engine core 204 operates by drawing air, via the fan 206, through a compressor intake section 214 of an engine compressor 216 (e.g., a core compressor) in the engine core 204. The engine compressor 216 includes multiple compressor sections. For example, as shown, the engine compressor 216 is a dual-axial compressor that includes two compressors, a first or low-pressure compressor (LPC) 218 and a second or high-pressure compressor (HPC) 220. In the example shown, the LPC 218 provides relatively low pressure air and the HPC 220 provides relatively high pressure air. The LPC 218 and HPC 220 are operatively coupled to respective low pressure compressor (LPC) shaft 222 (e.g., a first core shaft) and high pressure compressor (HPC) shaft 224 (e.g., a second core shaft). A turbine 226 (e.g., a core turbine) drives the fan 206 and the engine compressor 216. Specifically, the turbine 226 includes a lower-pressure (LP) turbine 228 and a high-pressure (HP) turbine 230. To drive the engine compressor 216 and the fan 206, the LPC shaft 222 is operatively coupled to the LP turbine 228 and the HPC shaft 224 is operatively coupled to the HP turbine 230. Thus, the LPC 218 and the HPC 220 are shaft-driven power devices. As used herein, a shaft-driven power device means a machine or device that can absorb power or receive energy via an input shaft of the machine. For example, the LPC 218 includes the LPC shaft 222 (e.g., an input shaft) that receives power from the LP turbine 228 and the HPC 220 includes the HPC shaft 224 (e.g., an input shaft) that receives power from the HP turbine 230. Thus, the LPC 218 and the HPC are shaft-driven power devices or machines that can receive power or energy. In some examples, the engine compressor 216 may include more or fewer compressor sections, each having, for example, a turbine and a shaft.

After exiting the HPC 220, the highly pressurized air is provided to a combustion chamber 232, where fuel is injected and mixed with the high pressure air and ignited. The high energy airflow exiting the combustion chamber 232 turns blades of the LP turbine 228 and the HP turbine 230, which are coupled to respective ones of the LPC shaft 222 or HPC shaft 224. Rotation of the LPC shaft 222 and HPC shaft 224 turns blades of the LPC 218 and HPC 220. The heated air is exhausted via a nozzle 234 where it mixes with the fan air 210a having a cooler temperature provided by the fan 206 and that bypasses the engine core 204 (e.g., the engine core) via the fan bypass 212 to produce forward thrust that propels the aircraft 100 (FIG. 1) in a forward direction. While in this example the aircraft engine 110 is implemented as a turbofan engine, the power recovery system 202 can similarly be implemented in connection with other types of engines (e.g., a turboprop engine, an open rotor engine, etc.).

To supply various systems of the aircraft 100 with pressurized air (i.e., compressed air), the aircraft engine 110 of the illustrated example includes the bleed air system 200. For example, the bleed air system 200 provides supply air (e.g., pressurized, cooled and/or heated air) to various systems including, for example, an environmental control system (ECS) 236, a thermal anti-icing system (TAI) 238 that includes an engine anti-icing system (EAI) 238a and a wing anti-icing system (WAI) 238b and/or any other system(s) 240 of the aircraft 100 that utilizes pressurized, cooled and/or heated air. The ECS 236, for example, conditions cabin supply air to a cabin pressure and/or cabin temperature and supplies the conditioned air to the cabin 108 of the fuselage 102 (FIG. 1). In particular, air provided by the ECS 236 is used to pressurize the cabin 108 as well as provide cooled and/or heated air for regulating a temperature of the air in the cabin 108 to a comfortable setting. The ECS 236 can include one or more ECS packs (e.g., an air cycle refrigeration system) that receive the pressurized air (e.g., pressurized and/or heated air) from the bleed air system 200 and conditions or regulates the air to cabin pressure and/or temperature. The EAI 238a and the WAI 238b utilize the supply air to de-ice or prevent ice formation on exterior surfaces of the aircraft engines 110, 112 and the wings 104, 106 of FIG. 1, respectively. The supply air can be provided to the other system(s) 240 including, for example, pneumatic system(s), etc.

To provide pressurized supply air, the bleed air system 200 of the illustrated example extracts bleed air from the aircraft engine 110. For example, the bleed air system 200 extracts bleed air from a dedicated compressor stage of the HPC 220 (e.g., a first stage, a second stage, a fourth stage, etc.). Specifically, the bleed air is provided from a first bleed port 242 (e.g., a fourth stage bleed port) of the HPC 220 and/or from a second bleed port 244 (e.g., a $10^{th}$ stage bleed port) of the HPC 220 (e.g., a two-port mix manifold). In some instances, the bleed air extracted from the HPC 220 can have a pressure of between approximately 40 psi and 150 psi and a temperature of between approximately 50° F. and 700° F. In some examples, the bleed air system 200 extracts bleed air from the LPC 218 via an LP bleed port. In some examples, the bleed air system 200 extracts bleed air from the first bleed port 242, the second bleed port 244, and/or other bleed ports (i.e., receives mixed bleed air from various bleed air ports and/or compressor stages).

The power recovery system 202 includes a power recovery (PR) turbine 250 that receives bleed air via a turbine inlet 252 (i.e., a bleed air inlet) and exhausts bleed air via a turbine outlet 254 (e.g., a bleed air outlet) to a precooler 256 (e.g., a heat exchanger). The precooler 256 receives bleed air and provides the bleed air to downstream systems (e.g., the ECS 236, the other systems 240, airframe ducts, etc.). The precooler 256 is configured to receive the fan air 210a from a fan duct 290 via a fan air inlet 292 to extract heat from the bleed air passing through the precooler 256 to reduce the temperature of the bleed air. The heated fan air exits the precooler 256 via a fan air exit 294 is exhausted via an aft vent (e.g., and used for thrust recovery).

Additionally, the power recovery system 202 extracts or harvests energy from the engine bleed air. Specifically, the PR turbine 250 generates power when processing the bleed air from the turbine inlet 252 to the turbine outlet 254 and transfers the generated power to the engine compressor 216 of the aircraft engine 110. For example, the PR turbine 250 extracts or harvests energy by reducing one or more parameters (e.g., temperature, pressure, etc.) from the bleed air as the bleed air flows between the turbine inlet 252 and the turbine outlet 254. In some examples, the power recovery system 202 extracts energy from the bleed air during a predetermined operating state of the aircraft 100 (e.g., taxiing, takeoff, climb, cruise, descent, landing, etc.). The energy extracted from the bleed air is converted into power (e.g., shaft horsepower) and transferred (e.g., fed back) into the aircraft engine 110 by the PR turbine 250. In the illustrated example, shaft horsepower is transferred to the HPC shaft 224 via the PR turbine 250. However, in some examples, the energy extracted by the PR turbine 250 is fed back into the LPC shaft 222.

To operatively couple the power recovery system 202 and the aircraft engine 110, the aircraft engine 110 employs a transmission 260 (e.g., fixed gear ratio transmission, a continuous variable transmission, etc.). In some examples, the power recovery system 202 and/or the transmission 260 provides means for transferring energy (e.g., horsepower) to the aircraft engine 110. The transmission 260 includes a driveshaft 262 having a first gear 264 (e.g., a bevel gear) that engages (e.g., enmeshes) with a second gear 266 (e.g., a second bevel gear) that is operatively coupled to the HPC shaft 224 of the HPC 220.

Figure 3:
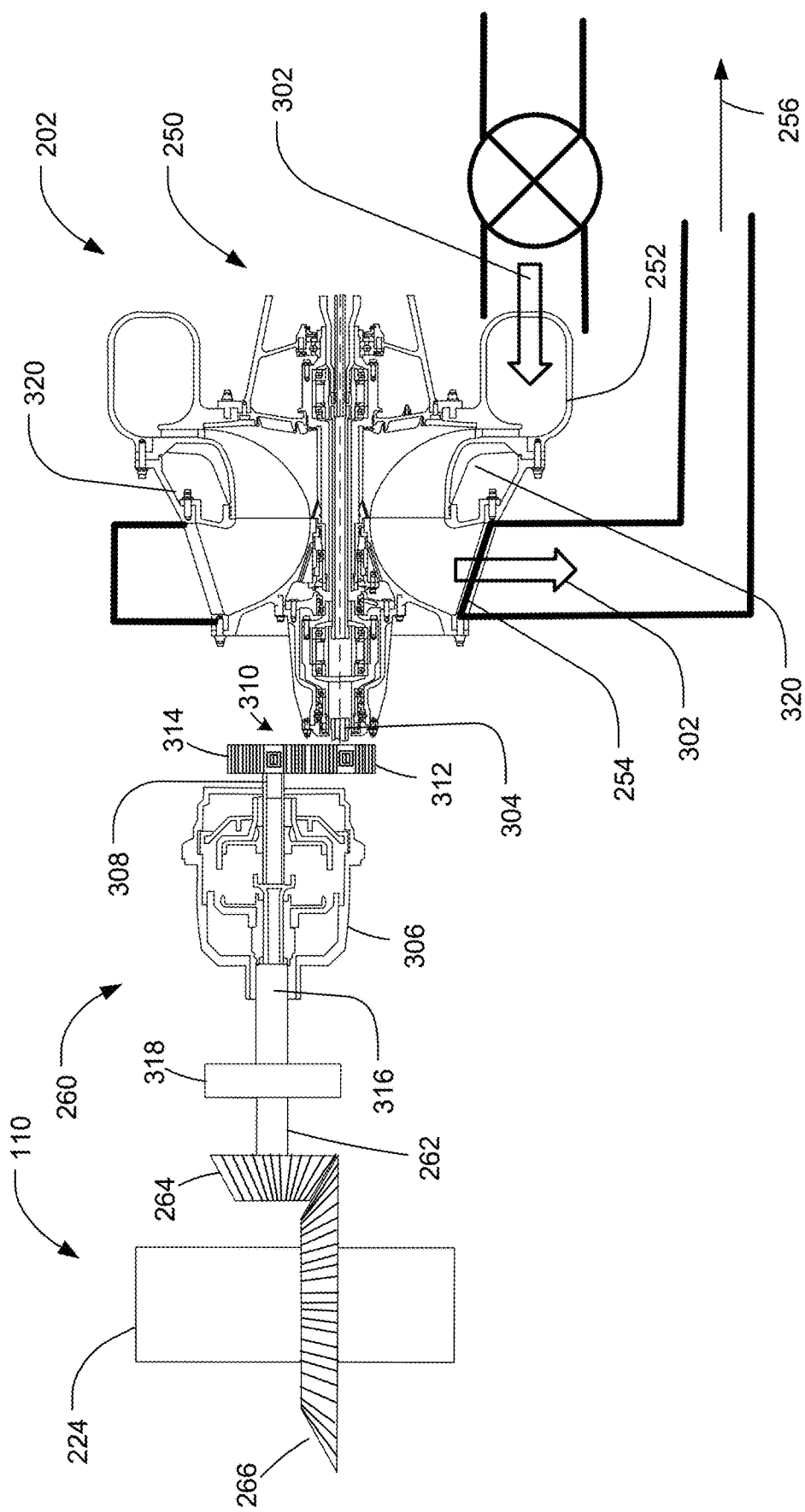
FIG. 3 is a schematic illustration of an example transmission of the example power recovery system of FIG. 2.

FIG. 3 is a schematic illustration of the example transmission 260 of FIG. 2. The power recovery system 202 is driven by bleed air 302 from the aircraft engine 110. For example, the bleed air 302 flows to the turbine inlet 252, through the PR turbine 250 and flows to the precooler 256 via the turbine outlet 254. The PR turbine 250 converts energy in the bleed air 302 into power (e.g., shaft horsepower) and transfers the power to the aircraft engine 110. For example, at the turbine inlet 252, the bleed air has one or more first fluid characteristics (e.g., a bleed air temperature, a bleed air pressure, etc.). At the turbine outlet 254, the bleed air 302 has one or more second fluid characteristics (e.g., bleed air temperature, a bleed air pressure, etc.) that is different than (e.g., less than) at the first fluid characteristics of the bleed air 302 at the turbine inlet 252. For example, the bleed air 302 has a first pressure and a first temperature at the turbine inlet 252 that is greater than a second pressure and a second temperature at the turbine outlet 254. Thus, the PR turbine 250 reduces a pressure and a temperature of the bleed air 302 as the bleed air 302 flows through the PR turbine 250 from the turbine inlet 252 to the turbine outlet 254. Energy extracted from the bleed air 302 (e.g., energy from reducing the temperature and pressure of the bleed air 302) is harvested or extracted by the PR turbine 250. The PR turbine 250 outputs the energy (e.g., power) via a turbine output shaft 304, which transfers to the aircraft engine 110 via the transmission 260 (e.g., a continuous variable transmission). For example, the turbine output shaft 304 is operatively coupled to the HPC shaft 224 via the transmission 260. The transmission 260 is installed between the aircraft engine 110 (e.g., the HPC shaft 224) and the PR turbine 250.

The transmission 260 enables a speed of the PR turbine 250 to vary (e.g., increase or decrease) relative to an operating speed of the aircraft engine 110 (e.g., the HPC shaft 224). For example, the transmission 260 varies (e.g., increases or decreases) a speed (e.g., the revolutions per minute (RPMs)) of the PR turbine 250 to match a speed (e.g., the revolutions per minute (RPMs)) of the HPC shaft 224 of the aircraft engine 110. Specifically, the gearbox 306 matches an RPM of the turbine output shaft 304 and an RPM of the HPC shaft 224 to enable the PR turbine 250 to transfer torque to the HPC shaft 224.

To vary the speed of the turbine output shaft 304, the transmission 260 includes a gearbox 306. For example, the gearbox 306 is a speed reduction gearbox or a multi-speed gearbox. The gearbox 306 operatively couples to the PR turbine 250 and the HPC shaft 224. For example, the gearbox 306 includes a gearbox input shaft 308 that is operatively coupled to the turbine output shaft 304 via a gear train 310. The gear train 310 of the illustrated example includes a first gear 312 (e.g., a spur gear) and a second gear 314 (e.g., a spur gear) enmeshed with the first gear 312. The first gear 312 is coupled (e.g., fixed or keyed) to the turbine output shaft 304 such that the first gear 312 rotates with the turbine output shaft 304. The second gear 314 is coupled (e.g., fixed or keyed) to the gearbox input shaft 308 such that the second gear 314 rotates with the gearbox input shaft 308. Thus, rotation of the turbine output shaft 304 causes rotation of the gearbox input shaft 308 via the gear train 310 (e.g., the first gear 312 and the second gear 314). In turn, the gearbox input shaft 308 causes rotation of a gearbox output shaft 316. The gearbox output shaft 316 is coupled to the driveshaft 262. The first gear 264 is coupled (e.g., fixed or keyed) to the driveshaft 262, which is engaged (e.g., enmeshed) with the second gear 266 operatively coupled (e.g., fixed or keyed) to the HPC shaft 224 of the HPC 220. In the example shown, the first gear 264 and second gear 266 are oriented substantially perpendicular to each other. As the driveshaft 262 rotates about its longitudinal axis, the first gear 264, which is engaged with the second gear 266, rotates the second gear 266 and, thus, the HPC shaft 224 about its longitudinal axis thereby transferring power or energy (e.g., horsepower) to the aircraft engine 110.

In the illustrated example, a gear ratio is employed between the HPC shaft 224 and the PR turbine 250 to allow the rotational speed of the driveshaft 262 to match (e.g., match an RPM) of the HPC shaft 224. For example, the gearbox 306 varies (e.g., increases or decreases) a rotational speed of the gearbox input shaft 308 to provide a rotational speed of the gearbox output shaft 316 that matches a rotational speed of the HPC shaft 224 based on a gear ratio of the first gear 264 and the second gear 266 (e.g., a 2:1 ratio of the first gear 264 to the second gear 266, a 1:1 ratio of the first gear 264 to the second gear 266, etc.). Thus, the turbine output shaft 304 rotates to provide power (e.g., horsepower) to HPC shaft 224 via the transmission 260 (e.g., the gearbox 306).

To engage and/or disengage the transmission 260 and the HPC shaft 224, the transmission 260 includes a clutch 318. The clutch 318 moves between an engaged position to rotatably couple the turbine output shaft 304 and the HPC shaft 224 and a disengaged position to decouple the turbine output shaft 304 and the HPC shaft 224. In the disengaged position, the clutch 318 prevents the transfer of power (e.g., horsepower) from the PR turbine 250 to the HPC shaft 224. In this manner, the clutch 318 can be employed to deactivate the PR turbine 250 when power recovery is not desired (e.g., during taxiing). The power recovery system 202 is external relative to the engine core 204 of the aircraft engine 110. For example, the PR turbine 250, the gearbox 306 and/or the clutch 318 are disposed within the nacelle 208 (e.g., an upper bifurcation) of the aircraft engine 110. Additionally, although the second gear 266 is shown as operatively coupled to the HPC shaft 224 in the illustrated example, in other examples, the second gear 266 can be operatively coupled to and driven by the LPC shaft 222 of the LPC 218 or any other driveshaft of the aircraft engine 110. In some examples, the transmission 260 (e.g., the gearbox 306, the turbine output shaft 304) can operatively couple to one or more other systems used in the aircraft 100 such as, for example, an electrical generator and/or a hydraulic pump (e.g., instead of the HPC shaft 224). The gearbox 306, being a multispeed gearbox capable of being clutched out via the clutch 318 allows for a wide range of operating conditions and/or allows the bleed air system 200 to handle a failure mode scenario of the PR turbine 250.

The PR turbine 250 of the illustrated example is a radial inflow turbine. To account for varying inflow conditions (e.g., pressure fluctuations of the bleed air) and/or varying outflow demands, the PR turbine 250 includes an adjustable nozzle or variable inlet guide vanes 320. The variable inlet guide vanes 320 can enable the PR turbine 250 to handle a range of variability in the inlet conditions and the outlet demands. More particularly, in some examples, the variable inlet guide vanes 320 can be adjusted to achieve a higher or a lower air flow, temperature and/or pressure at the turbine outlet 254. Thus, a turbine discharge pressure at the turbine outlet 254 is regulated by modulating the variable inlet guide vanes 320. In other examples, the PR turbine 250 can include movable vanes, diffuser guide vanes, a vane-less diffuser or system having a ported shroud can be employed to account for varying inflow conditions and outflow demands, and/or any other variable geometry features to handle a range of variability in the inlet conditions and the outlet demands.

Figure 4:
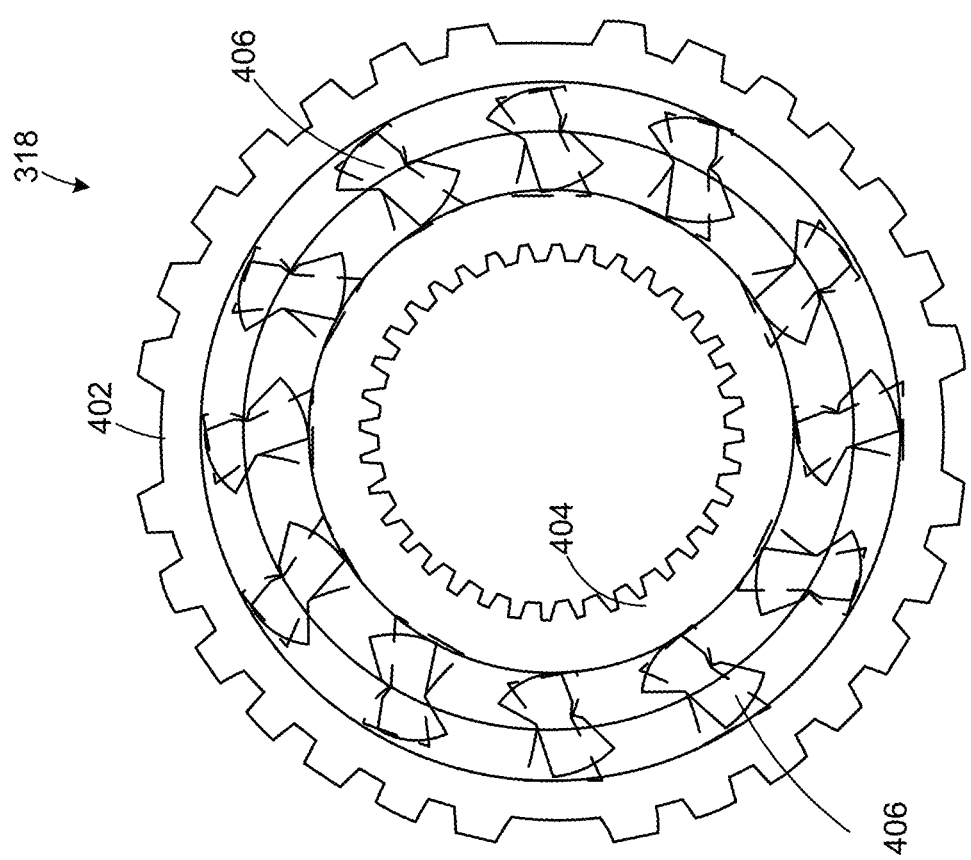
FIG. 4 is a schematic illustration of an example clutch of the example transmission of FIG. 3.

FIG. 4 is a front view of the example clutch 318 of FIG. 3. The clutch 318 of the illustrated example is a sprag clutch. The clutch 318 is a one-way, mechanical clutch. The clutch 318 includes an outer race 402, an inner race 404 and sprags 406 (e.g., spring-loaded sprags) circumferentially positioned between the inner race 404 and the outer race 402. The sprags 406, via friction, operatively engage the inner race 404 and the outer race 402 and operatively disengage the inner race 404 and the outer race 402. For example, the gearbox output shaft 316 is coupled to the outer race 402 and the driveshaft 262 is coupled (e.g., fixed or keyed) to the inner race 404. Specifically, the outer race 402 drives the inner race 404 via frictional engagement of the sprags 406 when the gearbox output shaft 316 rotates (e.g., in a first direction) and the inner race 404 can free wheel (e.g., the outer race 402 does not drive the inner race 404) when the gearbox output shaft 316 does not rotate. While a sprag clutch is shown in FIG. 4, the transmission 260 can employ any other suitable clutch configured to engage and disengage the turbine output shaft 304 and the HPC shaft 224. In some examples, the transmission 260 can employ an electronic clutch. In some examples, the transmission 260 can employ a planetary gear system (e.g., a power split planetary gear system), a multi-speed discrete gear ratio system, a fixed gear ratio system, and/or any other suitable transmission. In some examples, the transmission 260 can include a fixed ratio gear train provided between the turbine output shaft 304 and the driveshaft 262.

Figure 5:
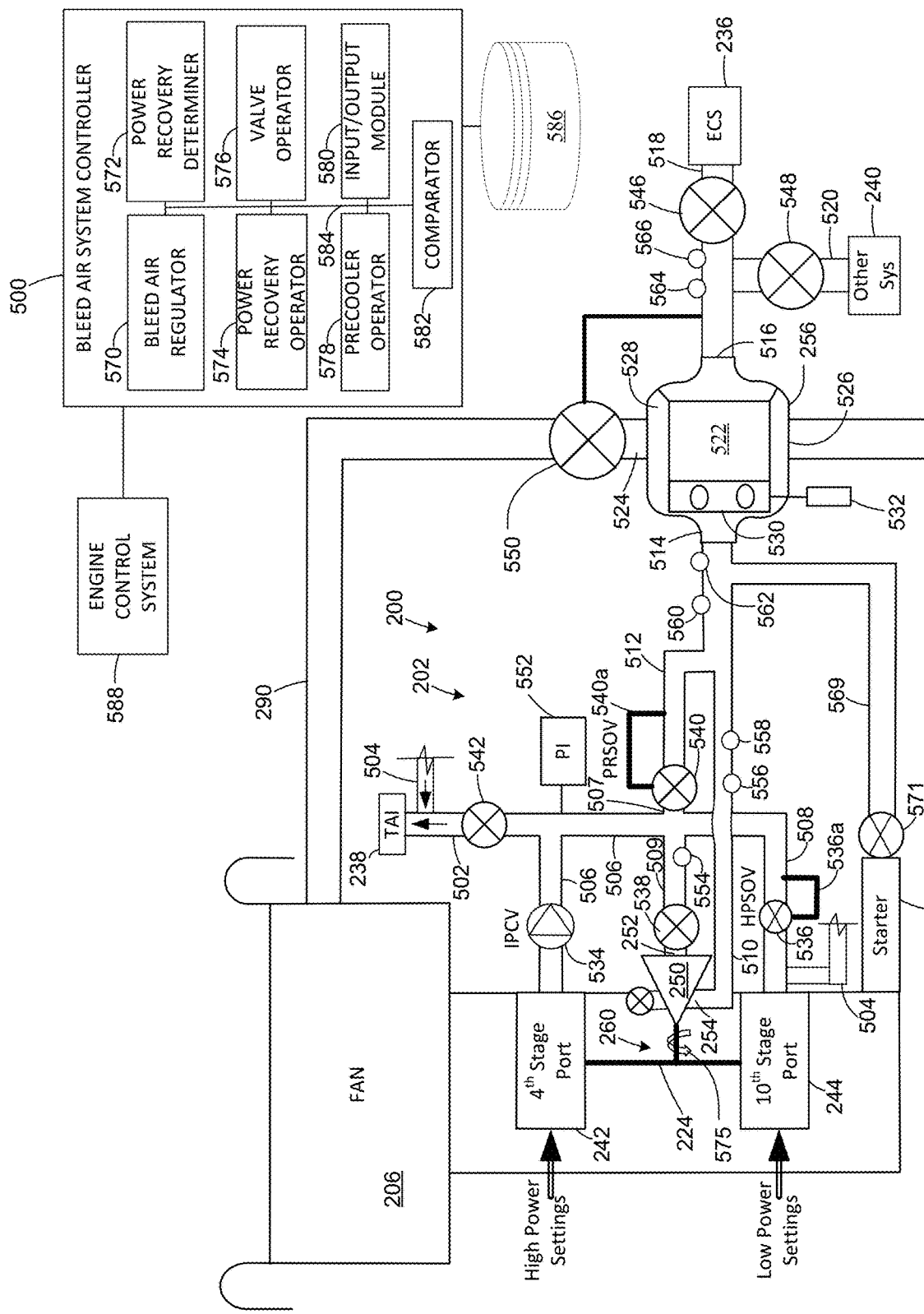
FIG. 5 is a schematic illustration of the example bleed air system of FIGS. 1-4.

FIG. 5 is a schematic illustration of the bleed air system 200 of FIGS. 1-4. To provide bleed air to aircraft systems (e.g., the ECS 236, the TAI 238, etc.), the bleed air system 200 employs a bleed air system controller 500. The bleed air system 200 includes a first TAI passageway 502 to fluidly couple the first bleed port 242 and the TAI 238 and a second TAI passageway 504 to fluidly couple the second bleed port 244 and the TAI 238. In some examples, the TAI 238 receives bleed air from the first bleed port 242 via the first TAI passageway 502, the second bleed port 244 via the second TAI passageway 504 and/or a mixture of bleed air from the first bleed port 242 and the second bleed port 244 via the first TAI passageway 502 and the second TAI passageway 504.

The power recovery system 202 includes a low-pressure power recovery (LPPR) passageway 506 and a high-pressure power recovery (HPPR) passageway 508. The LPPR passageway 506 fluidly couples the first bleed port 242 and the turbine inlet 252 and the HPPR passageway 508 fluidly couples the second bleed port 244 and the turbine inlet 252. For example, the LPPR 506 and the HPPR 508 are fluidly coupled at a junction 507 and a PR passageway 509 fluidly couples the LPPR 506 and the HPPR 508 to the turbine inlet 252. A power recovery (PR) manifold 510 fluidly couples the turbine outlet 254 and the precooler 256. As used herein, a passageway or a manifold includes one or more ducts, pipes, hoses, and/or other fluid flow system(s) or device(s).

To provide bleed air to the precooler 256 when the power recovery system 202 is in a deactivated state, the bleed air system 200 includes a main manifold 512. The main manifold 512 is fluidly coupled to the first bleed port 242 and/or the second bleed port 244. In the illustrated example, the main manifold 512 is fluidly coupled to the first bleed port 242 via the LPPR passageway 506 and is fluidly coupled to the second bleed port 244 via the HPPR passageway 508. In some examples, the main manifold 512 is fluidly coupled to the first bleed port 242 and/or the second bleed port 244 via respective dedicated (e.g., isolated) passageways. The main manifold 512 is fluidly coupled to the precooler 256. In the illustrated example, the main manifold 512 is fluidly coupled to PR manifold 510 upstream from the precooler 256. In some examples, bleed air from the main manifold 512 can mix with bleed air in the PR manifold 510 prior to providing the mixed bleed air to the precooler 256.

The precooler 256 includes a precooler inlet 514 to receive bleed air from the PR manifold 510 and/or the main manifold 512 and a precooler outlet 516 fluidly coupled to the ECS 236 via an ECS passageway 518 and the other systems 240 via an auxiliary passageway 520. To cool the bleed air flowing through the precooler 256, the bleed air is directed through a heat exchanger portion 522 of the precooler 256. The precooler 256 of the illustrated example includes the heat exchanger portion 522 between the precooler inlet 514 and the precooler outlet 516. The heat exchanger portion 522 receives bleed air from the PR manifold 510 and/or the main manifold 512. A cooling fluid (e.g. fan air 210a) flows through the precooler 256 between a cooling fluid inlet 524 and a cooling fluid outlet 526 to remove heat and, thus, cool bleed air flowing through the heat exchanger portion 522. The bleed air flowing through the heat exchanger portion 522 is fluidly isolated from the cooling fluid (i.e., the bleed air does not mix with the fan air 210a). To provide cooling fluid to the precooler 256, the bleed air system 200 includes the fan duct 290 to channel the fan air 210a from the fan 206 to the cooling fluid inlet 524.

The precooler 256 of the illustrated example includes a precooler bypass 528 to enable bleed air to bypass the precooler 256 (e.g., the heat exchanger portion 522). When flowing through the precooler bypass 528, the bleed air is not cooled. To direct bleed air flow between the heat exchanger portion 522 and the precooler bypass 528, the precooler 256 includes a precooler valve 530 and an actuator 532 (e.g., a linear actuator). The actuator 532 moves the precooler valve 530 been a first position to allow bleed air to flow through the heat exchanger portion 522 and block or restrict bleed air flow through the precooler bypass 528, and a second position to allow bleed air to flow through the precooler bypass 528 and block or restrict bleed air flow through the heat exchanger portion 522. An example heat exchanger that can implement the precooler 256 is described in U.S. patent application Ser. 13/624,612, filed on Sep. 21, 2012, which is hereby incorporated herein by reference. In some examples, the precooler 256 can be a heat exchanger without the precooler bypass 528.

To start the aircraft engine 110, the aircraft engine 110 includes a starter 567. The starter 567 is fluidly coupled to the aircraft engine 110. A starter passageway 569 fluidly couples the starter 567 and the precooler inlet 514 of the precooler 256. To start the aircraft engine 110, an auxiliary unit provides pressurized fluid (pneumatic air) to the starter passageway 569 via the precooler outlet 516, through the precooler bypass 528 and the precooler inlet 514, and to the starter passageway 569. A starter valve 571 moves to an open position to enable the fluid in the starter passageway 569 to flow to the aircraft engine 110. After the aircraft engine 110 starts, the starter valve 571 is moved to a closed position to prevent fluid flow to the starter 567 through the starter passageway 569.

During operation, the bleed air system 200 provides conditioned air to the cabin 108 of the aircraft 100 (e.g., via the ECS 236) based on a number of passengers in the cabin 108. To determine a mass flow rate of supply air to be supplied to the cabin 108, the bleed air system controller 500 obtains, retrieves, and/or receives passenger count information from, for example, a database 586 and/or an engine control system 588. The passenger count information can be manually stored in the database 586. For example, in some aircraft, the target flow rate can be 0.55 pound mass (lb.)/min/passenger. The bleed air system controller 500 determines an amount of pressure difference with the bleed air system 200 that is required for the ECS 236 to provide the target flow rate. The bleed air system controller 500 determines which bleed port (e.g., the first bleed port 242 or the second bleed port 244) is producing sufficient pressurized bleed air to meet the target flow rate. Additionally, the power recovery system 202, via the bleed air system controller 500, determines if the pressure bleed air is sufficient to provide the target flow rate to the ECS 236. When the pressure is not sufficient, the bleed air system controller 500 deactivates the power recovery system 202. When the pressure is sufficient, the bleed air system controller 500 activates the power recovery system 202.

The bleed air system controller 500 enables the bleed air system 200 to extract bleed air from the first bleed port 242 (e.g., during high power settings) and bleed air from the second bleed port 244 (e.g., during low power settings). For example, high power settings can occur when the aircraft engine 110 produces thrust that exceeds a thrust threshold (e.g., during takeoff, climb, cruise, descent, etc.) and the lower power settings can occur when the aircraft engine 110 produces thrust that does not exceed a thrust threshold (e.g., during taxiing, flight taxiing, etc.). For example, during high power setting operation, a parameter (e.g., a pressure or temperature) of the bleed air is greater at the first bleed port 242 than a parameter (e.g., a pressure or temperature) of the bleed air at the first bleed port 242 during a lower power setting operation. Thus, during low power setting conditions, the bleed air system 200 extracts bleed air from the second bleed port 244 because bleed air at the first bleed port 242 may be insufficient to provide the target flow rate, temperature and/or pressure bleed air to the ECS 236. During high power setting conditions, the bleed air system 200 extracts bleed air from the first bleed port 242 because the bleed air at the first bleed port 242 can be sufficient to provide the target flow rate, temperature and/or pressure to the ECS 236. Performance efficiency increases when extracting bleed air from the first bleed port 242 because the engine compressor 216 compresses the fan air 210b a lesser number of times at the first bleed port 242 (e.g., fourth stage of compression) than at the second bleed port 244 (e.g., a tenth stage of compression). Thus, in this example, it is more desirable to extract bleed air from the first bleed port 242 than from the second bleed port 244.

To control bleed air flow within the bleed air system 200 and/or to the power recovery system 202, the bleed air system 200 includes one or more control valves 534-550. For example, to control bleed air flow from the first bleed port 242 to the TAI 238 and the turbine inlet 252 via the LPPR passageway 506, the bleed air system 200 includes a first control valve 534 (e.g., an intermediate pressure check valve (IPCV)). A second control valve 536 (e.g., a high pressure shutoff valve (HPSOV)) controls bleed air flow from the second bleed port 244 to the turbine inlet 252 via the HPPR passageway 508. In the illustrated example, the second control valve 536 includes a sensing line 536a to measure a pressure of fluid downstream from the second control valve 536. In this manner, the second control valve 536 can regulate a pressure of the bleed air downstream from (e.g., at an outlet of) the second control valve 536 based on a desired preset pressure value (e.g., a setting). The preset pressure value can be set mechanically and/or can be provided by the bleed air system controller 500 via a signal (e.g., an analog signal). To control the flow of bleed air to the turbine inlet 252 from the LPPR passageway 506 and/or the HPPR passageway 508, the power recovery system 202 includes a third control valve 538 (e.g., a shut-off valve (SOV)). The third control valve 538 provides a bleed air control valve to control the flow of bleed air to the turbine inlet 252.

To bypass the PR turbine 250 and control bleed air flow to the precooler 256 via the main manifold 512, the bleed air system 200 includes a fourth control valve 540 (e.g., a pressure regulating shut-off valve (PRSOV)). For example, the fourth control valve 540 enables bleed air to bypass the PR turbine 250 when use of the PR turbine 250 is not needed or desired. For example, if pressure of the bleed air from the first bleed port 242 is insufficient to meet the pressure requirements of the ECS 236, the bleed air can bypass the PR turbine 250 to not realize a pressure drop across the PR turbine 250. In the illustrated example, the fourth control valve 540 includes a sensing line 540a to sense a pressure of fluid in the main manifold 512 downstream from the fourth control valve 540. In this manner, the fourth control valve 540 can regulate a pressure downstream of the fourth control valve 540 (e.g., at an outlet of the fourth control valve 540) based on a desired preset value (e.g., a setting). The preset value can be set mechanically and/or can be provided by the bleed air system controller 500 via a signal (e.g., an analog signal).

The bleed air system 200 includes a fifth control valve 542 (e.g., a low-stage anti-ice valve) to control bleed air flow to the TAI 238, a sixth control valve 546 to control bleed air to the ECS 236, and a seventh control valve 548 to control bleed air flow to the other systems 240. To control the flow of cooling fluid between the cooling fluid inlet 524 and the cooling fluid outlet 526 of the precooler 256, the bleed air system 200 includes a fan valve 550.

Each of the control valves 534-550 operates independently of the other valves and can operate between an open position (e.g., a fully open position or state) to allow fluid flow through the respective control valves 534-550 and a closed position (e.g., a fully closed position or state) to prevent or restrict fluid flow through the respective control valves 534-550. The control valves 534-550 can include a pressure-regulating valve (PRV), a pressure-regulating shut off valve (PRSOV), a shut off valve (SOV), a high pressure shut off valve (HPSOV), an intermediate pressure check valve (IPCV), a back-flow prevention valve, a multi-flow directional valve, a three-way valve, a four-way valve, etc., and/or any other air control device. In some examples, the bleed air system 200 can include more or less than the number of control valves 534-550, the passageways 502-508, 518, 520 and/or the manifolds 510-512 disclosed herein. For example, while the control valves 534-550, the passageways 502-508, 518, 520 and/or the manifolds 510-512 are illustrated in FIG. 5, one or more additional valves, passageways and/or manifolds can be incorporated in the bleed air system 200.

To measure parameters or characteristics of the bleed air, the bleed air system 200 includes one or more sensors 552-566 (e.g., temperature sensors, pressure sensors, flow sensors, humidity sensors, etc.). For example, the bleed air system 200 includes the one or more sensors 552-566 to measure temperature, pressure, flow rate and/or any other parameter(s) or characteristic(s) of the bleed air system 200. For example, one or more sensor(s) 552 is/are coupled to the LPPR passageway 506 to measure pressure and/or flowrate of the bleed air flowing to the turbine inlet 252 via the LPPR passageway 506 an/or the HPPR passageway 508. One or more sensor(s) 554 is/are coupled adjacent the turbine inlet 252 to measure a temperature of the bleed air at the turbine inlet 252. One or more sensor(s) 556 is/are coupled to the PR manifold 510 to measure a pressure of the bleed air exiting the turbine outlet 254 prior to the bleed air flowing to the precooler 256. One or more sensor(s) 558 is/are coupled to the PR manifold 510 to measure a temperature of the bleed air exiting the turbine outlet 254. One or more sensor(s) 560 is/are coupled adjacent the precooler inlet 514 (downstream from the main manifold 512) to measure a pressure of the bleed air entering the precooler inlet 514. One or more sensor(s) 562 is/are coupled adjacent the precooler inlet 514 (downstream from the main manifold 512) to measure a temperature of the bleed air entering the precooler inlet 514. One or more sensor(s) 564 is/are coupled adjacent the precooler outlet 516 (downstream from the precooler outlet 516) to measure a pressure of the bleed air exiting the precooler outlet 516. One or more sensor(s) 566 is/are coupled adjacent the precooler outlet 516 (downstream from the precooler outlet 516) to measure a temperature of the bleed air exiting the precooler outlet 516. Additional sensors can be provided in various other locations to similarly measure one or more parameters of the supply air at various points in the bleed air system 200.

To control operation of the power recovery system 202, the bleed air system 200 includes the bleed air system controller 500. The bleed air system controller 500 can be implemented by a controller or processor, such as the processor 1512 of the processor platform 1500 disclosed in connection with FIG. 15. The bleed air system controller 500 is communicatively coupled to one or more the control valves 538-550, the one or more sensors 552-566, the variable inlet guide vane 320 (FIG. 3) of the PR turbine 250, the gearbox 306, the clutch 318, the actuator 532, and/or any other device that controls various devices and/or monitors various parameters (e.g., mass flow rate, pressure, temperature, etc.) of the bleed air system 200 and/or the power recovery system 202.

In the illustrated example, the bleed air system controller 500 includes a bleed air regulator 570, a power recovery determiner 572, a power recovery operator 574, a valve operator 576, a precooler operator 578, an input/output (I/O) module 580, and a comparator 582 communicatively coupled via a bus 584. In the illustrated example, the bleed air system controller 500 is communicatively coupled to an engine control system 588, which receives or determines operating parameters and/or flight conditions including, for example, altitude, air speed, throttle lever position, air pressure, air temperature, humidity, engine speed, air density, passenger count, engine speed (RPM), HP shaft RPM, LP shaft RPM, high power setting condition, a low power setting condition, and/or other parameter(s). The database 586 communicatively coupled to the bleed air system controller 500 includes PR turbine mapping data, threshold values (e.g., bleed air pressure threshold(s), turbine outlet temperature and/or pressure threshold(s), precooler inlet temperature and/or pressure threshold(s), turbine inlet temperature and/or pressure threshold(s), HP shaft RMP threshold(s) or range(s), precooler outlet temperature and/or pressure threshold(s), etc.

The I/O module 580 receives signals from one or more of the sensors 552-566 measuring one or more parameters of the bleed air system 200. The comparator 582 can be used to compare the measured values of the parameter(s) provided by the one or more sensors 552-566 to one or more thresholds or threshold ranges (e.g., stored in the database 586 accessible by the bleed air system controller 500). Based on whether the parameter(s) satisfy the thresholds or threshold ranges, the valve operator 576 can operate one or more of the valves 534-548 to provide bleed air having desired parameters (e.g., pressure and/or temperature) to the ECS 236, the TAI 238, and/or the other system(s) 240. Additionally, the valve operator 576 can operate the fan valve 550 to control cooling fluid flow through the precooler 256. For example, the valve operator 576 controls operating states of the valves 536-550. For instance, any of the valves 536-550 can be operated between an open state (e.g., a fully open position) and a closed state (e.g., a fully closed position) and any state or position therebetween (e.g., a half open position) to control fluid flow through the respective TAI passageways 502 and 504, the LPPR passageway 506, the HPPR passageway 508, the main manifold 512, the ECS passageway 518, the auxiliary passageway 520, the PR turbine 250, etc.

In the illustrated example, the first control valve 534 is a check valve. Thus, the valve operator 576 does not control operation of the first control valve 534. For example, the first control valve 534 is a one-way, spring loaded check valve that operates based on a pressure differential across the check valve. If the pressure downstream from the first control valve 534 is less than a pressure of the bleed air at the first bleed port 242, the first control valve 534 moves to an open position to allow bleed air from the first bleed port 242 to flow to the LPPR passageway 506. If pressure downstream from the first control valve 534 is greater than a pressure of bleed air at the first bleed port 242 (e.g., when the second bleed port 244 is open), the first control valve 534 moves to a closed position to prevent bleed air from the first bleed port 242 to flow to the LPPR passageway 506. However, in some examples, the first control valve 534 can be a shut-off valve that is controlled by the valve operator 576 between an open position, a closed position, and/or one or more intermediate positions between the open position and the closed position.

During operation, the bleed air regulator 570 determines if a pressure of the bleed air from the first bleed port 242 flowing through the first control valve 534 is sufficient to provide the target flow rate and/or pressure to the ECS 236. For example, the bleed air regulator 570 receives one or more parameters from the engine control system 588 and/or the one or more sensors 552-566 via the I/O module 580 to determine whether to obtain bleed air at the first bleed port 242 based on a temperature and/or pressure of the bleed air at the first bleed port 242 or a temperature and/or pressure of the bleed air at the second bleed port 244. In some examples, the bleed air regulator 570 determines if the aircraft engine 110 is in a high power setting (e.g., based on altitude (e.g., cruise), angle of attack or thrust (e.g., takeoff, climb, descent, or landing)) or a low power setting (e.g., based on altitude, thrust, taxiing, flight idle, etc.).

In the illustrated example, the sensor 552 (e.g., an intermediate pressure sensor) measures a pressure of bleed air in the LPPR passageway 506 and provides a signal to the bleed air system controller 500. The bleed air regulator 570, via the comparator 582, determines if the pressure is greater than a pressure threshold (e.g., 40 psi) retrieved from the database 586 and/or the engine control system 588. If the measured pressure is greater than the pressure threshold, the bleed air regulator 570 commands the second control valve 536 (e.g. via the valve operator 576) to move to a closed position. When the second control valve 536 is closed, a pressure differential across the first control valve 534 causes the first control valve 534 to move to the open position to allow bleed air flow from the first bleed port 242 to the LPPR passageway 506. If the pressure measured by the sensor 552 is greater than the pressure threshold, the bleed air regulator 570 commands the second control valve 536 (e.g. via the valve operator 576) to move to an open position. When the second control valve 536 opens, a pressure differential across the first control valve 534 causes the first control valve 534 to move to the closed position to prevent bleed air flow from the first bleed port 242 to the LPPR passageway 506.

The power recovery determiner 572 obtains, collects and/or otherwise receives flight condition and/or aircraft engine operating condition information from the bleed air regulator 570 and/or the engine control system 588. For example, the power recovery determiner 572 receives a pressure value and/or a temperature value from the one or more sensors 552-566 via the I/O module 580 and/or a target flow rate, a target pressure and/or target temperature of the bleed air for use by the ECS 236, the other systems 240, etc. Additionally, the power recovery determiner 572 receives, retrieves and/or otherwise obtains PR turbine performance mapping information from the database 586 and/or receives, retrieves and/or otherwise obtains speed (e.g., RPM) of the HPC shaft 224.

Based on the parameters and/or condition information received, retrieved and/or otherwise obtained (e.g., a pressure of the bleed air, a temperature of the bleed air, a target flow rate, the turbine mapping, HP shaft RPM, etc.), the power recovery determiner 572 determines if the PR turbine 250 is capable of extracting energy from the bleed air and adding power (e.g., horsepower 575) to the HPC shaft 224. For example, the PR turbine 250 reduces a pressure and/or temperature of the bleed air as the bleed air flows through the PR turbine 250. If the resulting pressure, temperature and/or flow rate at the turbine outlet 254 is not sufficient to meet the demands of the ECS 236 or the other systems 240, the power recovery determiner 572 can determine to deactivate the power recovery system 202.

For example, the power recovery determiner 572 determines if one or more parameters (e.g., a target pressure, a target temperature, a target flow rate, HP shaft RPM, etc.) of the bleed air system 200 can be achieved based on one or more parameters of the bleed air at the turbine inlet 252 and resulting one or more parameters of the bleed air at the turbine outlet 254. For example, the power recovery determiner 572 determines if one or more parameters of the bleed air extracted from the first bleed port 242 or the second bleed port 244 are sufficient to achieve a target temperature, a target pressure, a target flow rate, etc., of bleed air at the turbine outlet 254 (e.g., for the precooler inlet 514 and/or the precooler outlet 516) after processing the bleed air via the PR turbine 250 to extract energy. For example, the power recovery determiner 572 determines if a pressure of the bleed air at the turbine inlet 252 is sufficient to provide a target pressure at the turbine outlet 254 after recovering energy from the bleed air by processing the bleed air through the PR turbine 250. In some examples, the power recovery determiner 572 determines if a temperature of the bleed air at the turbine inlet 252 is sufficient to provide a target temperature at the turbine outlet 254. In some examples, the power recovery determiner 572 determines if a temperature of the bleed air at the turbine inlet 252 is sufficient to provide a target temperature at the precooler inlet 514 by mixing the bleed air at the turbine outlet 254 (e.g., which may be less than the target temperature at the precooler 256) with bleed air from the main manifold 512 prior to the bleed air flowing to the precooler inlet 514. In some examples, the power recovery determiner 572 determines whether to activate the PR turbine 250 based on a speed (e.g., an RPM) of the HPC shaft 224 and/or a speed (e.g., an RPM) of the driveshaft 262. If the power recovery determiner 572 determines that the operating parameters of the bleed air are sufficient to activate the power recovery system 202, the power recovery determiner 572 commands the valve operator 576 to operate the one or more valves 536-550. When the power recovery system is activated, the power recovery operator 574 compares a speed (e.g., RPM) of the HPC shaft 224 and a speed (e.g., RPM) of the driveshaft 262. Based on the fixed gear ratio between the first and second gears 264 and 266, the power recovery operator 574 controls the gearbox 306 to enable the driveshaft 262 to operate at a speed that matches a speed of the HPC shaft 224 based on the fixed ratio of the first and second gears 264 and 266.

Additionally, when the power recovery system 202 is activated, the valve operator 576 commands or otherwise causes the third control valve 538 to move to an open position and the power recovery determiner 572 commands the power recovery operator 574 to operate the PR turbine 250. For example, the power recovery operator 574 operates or regulates the variable inlet guide vane 320 (FIG. 3) (e.g., a turbine nozzle) of the turbine inlet 252 to cause the clutch 318 (FIG. 3) to engage and enable the PR turbine 250 to transfer horsepower 575 to the HPC shaft 224 via the transmission 260. After the clutch 318 is engaged, the power recovery operator 574 commands or otherwise causes the variable inlet guide vane 320 to adjust (e.g., increase or decrease an angulator position) to affect a mass flow rate based on a pressure differential of the bleed air flowing between the turbine inlet 252 and the turbine outlet 254 required to achieve the target flow rate, target pressure, target temperature, for use by the ECS 236 or the other systems 240, the target speed (e.g., RPM) of the driveshaft 262 based on a speed (e.g., RPM) of the HPC shaft 224 and/or gear ratios, etc.

If the power recovery determiner 572 determines that the power recovery system 202 should be deactivated, the bleed air regulator 570 commands or otherwise causes the valve operator 576 to control the third control valve 538 to the closed position and controls the fourth control valve 540 to an open position to enable flow of bleed air to the precooler inlet 514 via the main manifold 512.

Whether or not the power recovery system 202 is activated or deactivated, the precooler operator 578 determines whether a temperature of the bleed air at the precooler outlet 516 is greater than a predetermined maximum threshold and/or within a predetermined threshold range. The precooler operator 578 controls the precooler valve 530 via the actuator 532 and the fan valve 550 to cool the bleed air via the precooler 256 or controls the precooler valve 530 via the actuator 532 to allow the bleed air to flow through the precooler bypass 528 without cooling.

While an example manner of implementing the bleed air system controller 500 is illustrated in FIG. 5, one or more of the elements, processes and/or devices illustrated in FIG. 5 may be combined, divided, re-arranged, omitted, eliminated and/or implemented in any other way. Further, the bleed air regulator 570, the power recovery determiner 572, the valve operator 576, the precooler operator 578, the input/output (I/O) module 580, the comparator 582 and/or, more generally, the example bleed air system controller 500 of FIG. 5 may be implemented by hardware, software, firmware and/or any combination of hardware, software and/or firmware. Thus, for example, any of the bleed air regulator 570, the power recovery determiner 572, the valve operator 576, the precooler operator 578, the input/output (I/O) module 580, the comparator 582 and/or, more generally, the example bleed air system controller 500 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the bleed air regulator 570, the power recovery determiner 572, the valve operator 576, the precooler operator 578, the input/output (I/O) module 580, the comparator 582 is/are hereby expressly defined to include a non-transitory computer readable storage device or storage disk such as a memory, a digital versatile disk (DVD), a compact disk (CD), a Blu-ray disk, etc. including the software and/or firmware. Further still, the example bleed air system controller 500 of FIG. 5 may include one or more elements, processes and/or devices in addition to, or instead of, those illustrated in FIG. 5, and/or may include more than one or any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
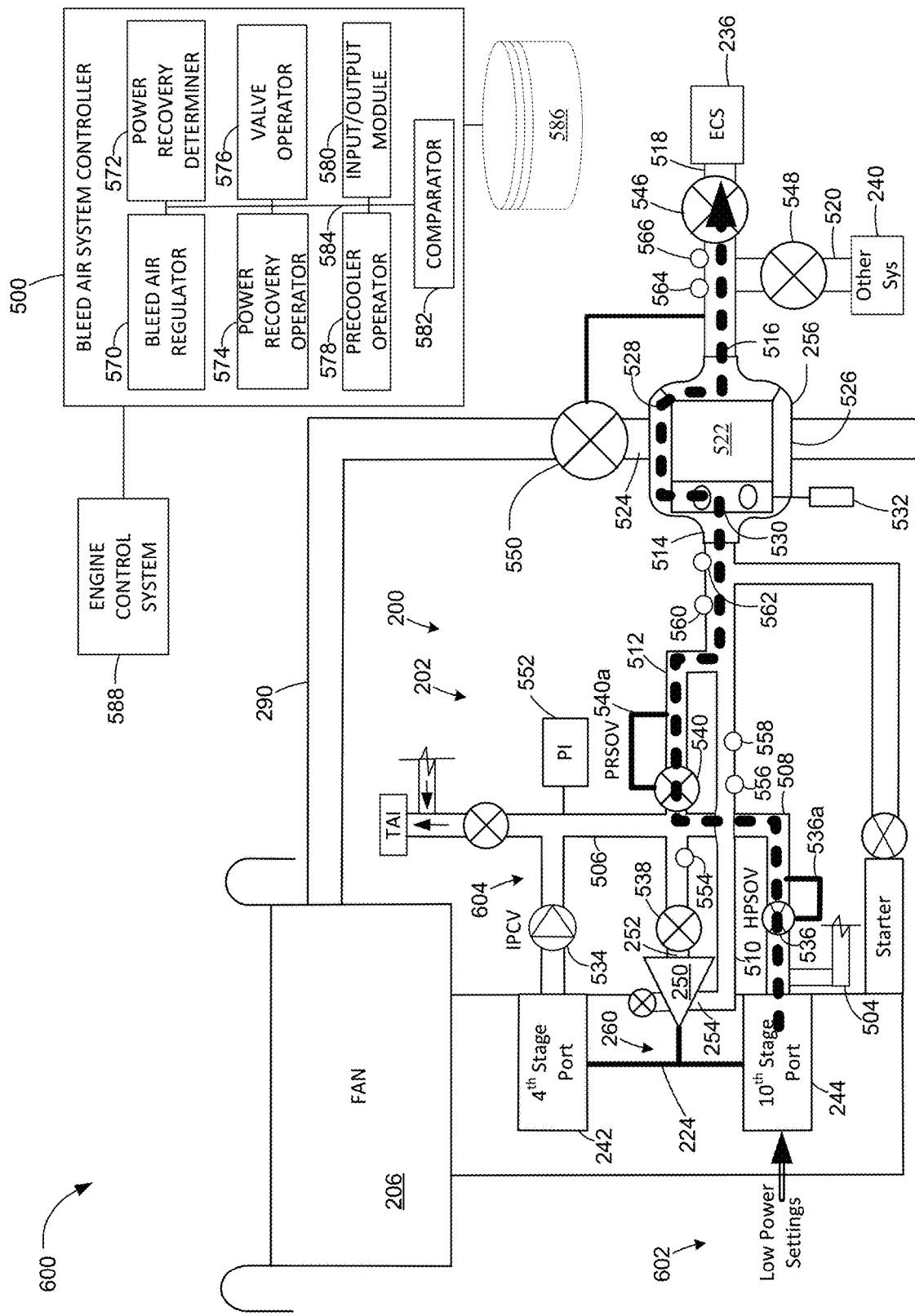
FIGS. 6-11 are schematic illustrations of the example bleed air system of FIGS. 1-5 shown in different modes of operation.

FIG. 6 is a schematic illustration of the bleed air system 200 of FIGS. 1-5 in a first mode of operation 600. In the first mode of operation 600, the aircraft engine 110 is in a low power setting 602 and ambient air temperature is less than an ambient temperature threshold (e.g., 75 degrees Fahrenheit). For example, in the first mode of operation 600, the aircraft 100 is in a taxi mode, an idle mode, and/or a flight idle mode. In the first mode of operation 600, the power recovery system 202 is in a deactivated state 604 and power (e.g., horsepower 575) is not generated by the PR turbine 250.

In the first mode of operation 600, bleed air flows from the second bleed port 244, through the HPPR passageway 508 and the main manifold 512, and to the precooler inlet 514. For example, the bleed air system controller 500 causes the second control valve 536 and the fourth control valve 540 to move to open positions to provide bleed air from the second bleed port 244 to the precooler inlet 514 via the HPPR passageway 508 and the main manifold 512. The first control valve 534 restricts or prevents bleed air from the first bleed port 242 into the LPPR passageway 506 and the third control valve 538 is in a closed position to prevent bleed air flow to the PR turbine 250. The bleed air flows through the precooler bypass 528 to the ECS 236.

For example, in the first mode of operation 600, the bleed air regulator 570 determines that the aircraft 100 is in the low power setting 602 based on information received, retrieved and/or otherwise obtained from the engine control system 588. Additionally, the power recovery determiner 572 receives, retrieves or otherwise obtains a measured pressure of the bleed air in the LPPR passageway 506 via the sensor 552 and compares (e.g., via the comparator 582) the measured pressure to a pressure threshold obtained from the database 586. In some examples, the bleed air regulator 570 determines that the aircraft engine 110 is in the low power setting 602 by comparing a speed (e.g., an RPM) of the HPC shaft 224 to a low power setting RPM threshold (e.g., an RPM range or table stored in the database 586). Because the aircraft engine 110 is in the low power setting 602, the power recovery determiner 572 determines that the measured pressure does not exceed the pressure threshold (e.g., 40 psi). In response to determining that the aircraft engine 110 is in a low power setting 602, the bleed air regulator 570 commands the valve operator 576 to open the second control valve 536 and open the fourth control valve 540 to allow bleed air from the second bleed port 244 to flow to the precooler 256 via the HPPR passageway 508 and the main manifold 512.

Additionally, the power recovery determiner 572 determines to move the power recovery system 202 to the deactivated state 604. To deactivate the power recovery system 202, the power recovery determiner 572 commands the valve operator 576 to move the third control valve 538 to a closed position to prevent bleed air flow through the PR turbine 250. Additionally, the precooler operator 578 receives, retrieves and/or otherwise obtains a measured temperature of the bleed air at the precooler inlet 514 via the sensor 562 and a target temperature for the ECS 236 via the database 586. The precooler operator 578 compares the measured temperature to the target temperature. In this example, the precooler operator 578 determines that the measured temperature does not exceed the target temperature and commands or otherwise causes the actuator 532 to move the precooler valve 530 to the second position to enable bleed air to flow through they precooler bypass 528.

Figure 7:
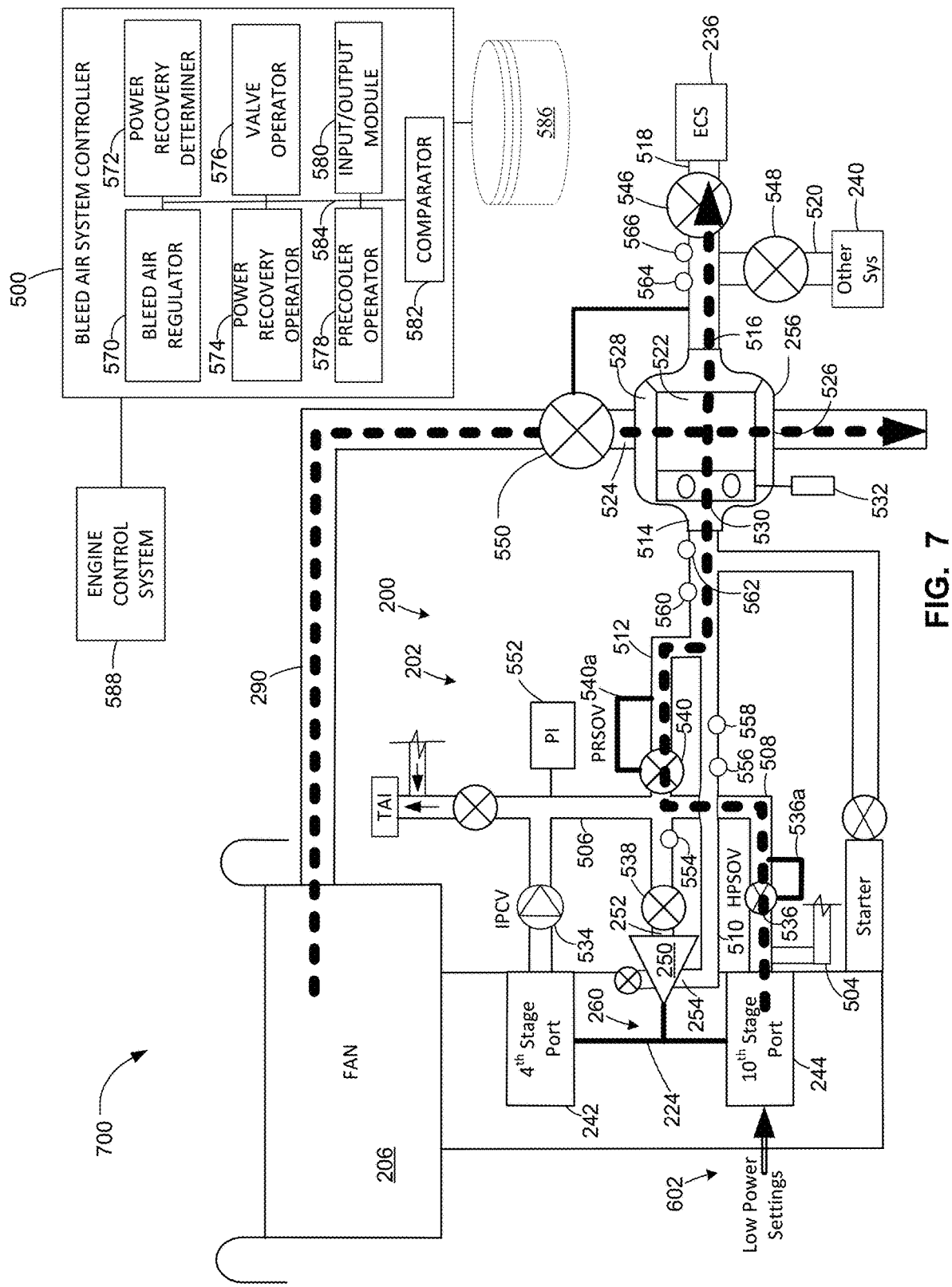

FIG. 7 is a schematic illustration of the bleed air system 200 of FIGS. 1-5 in a second mode of operation 700. In the second mode of operation 700, the aircraft engine 110 operates in the low power setting 602 and an ambient air temperature is greater than an ambient temperature threshold (e.g., 75 degrees Fahrenheit). In contrast to the example of FIG. 6, the bleed air is cooled (e.g., a temperature of the bleed air is reduced) via the precooler 256. For example, the precooler operator 578 determines that a measured temperature from the sensor 562 at the precooler inlet 514 exceeds a target temperature at the precooler outlet 516. To activate the precooler 256, the precooler operator 578 commands or otherwise causes the actuator 532 to move the precooler valve 530 to the first position to enable bleed air to flow through the heat exchanger portion 522. Additionally, the precooler operator 578 commands or otherwise causes the valve operator 576 to open the fan valve 550 to allow the fan air 210a (FIG. 2) to flow from the cooling fluid inlet 524 to the cooling fluid outlet 526 to cool the bleed air flowing through the heat exchanger portion 522. The precooler operator 578 receives a second measured temperature from the sensor 566 downstream from the precooler outlet 516 and compares the second measured temperature to the target temperature. The precooler operator 578 or the valve operator 576 modulates (e.g., opens and/or closes) the fan valve 550 to regulate the second measured temperature downstream from the precooler outlet 516 to the target temperature.

Figure 8:
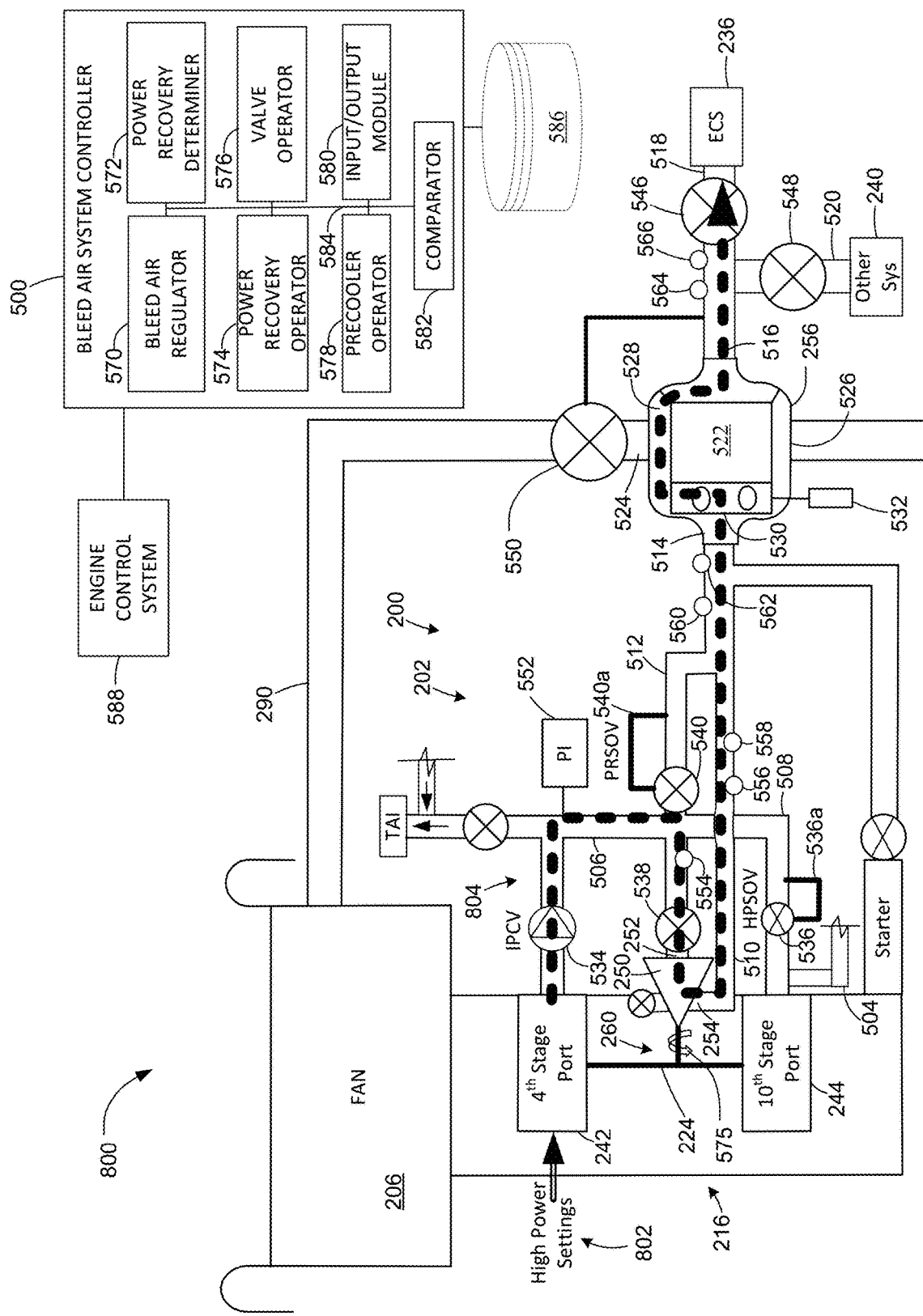

FIG. 8 is a schematic illustration of the bleed air system 200 of FIGS. 1-5 in a third mode of operation 800. In the third mode of operation 800, the aircraft engine 110 is in a high power setting 802 and ambient air temperature is less than an ambient temperature threshold (e.g., 75 degrees Fahrenheit). For example, the third mode of operation 800 can occur during take-off, cruise, and/or landing. In the third mode of operation 800, the power recovery system 202 is in an activated state 804 and the PR turbine 250 extracts power (e.g., horsepower 575) from the bleed air.

In the third mode of operation 800, the bleed air flows from the first bleed port 242 to the PR turbine 250. The PR turbine 250 expands the bleed air as the bleed air flows between the turbine inlet 252 and the turbine outlet 254. During this expansion, the pressure and/or temperature of the bleed air reduces as the bleed air flows through the PR turbine 250. The PR turbine 250 converts the energy to power and transfers the converted energy to the HPC shaft 224 via the transmission 260. The bleed air at the turbine outlet 254 flows to the precooler 256 via the PR manifold 510.

To provide bleed air from the first bleed port 242 to the turbine inlet 252 via the LPPR passageway 506, the bleed air system controller 500 causes the second control valve 536 and the fourth control valve 540 to move to closed positions to prevent bleed air from flowing from the second bleed port 244 to the turbine inlet 252 via the HPPR passageway 508 or bleed air from flowing through the main manifold 512. The first control valve 534 moves to an open position to allow bleed air from the first bleed port 242 to flow to PR turbine 250 based on a pressure differential across the first control valve 534. The bleed air flows through the precooler bypass 528 to the ECS 236.

In the third mode of operation 800, the bleed air regulator 570 determines that the aircraft 100 is in the high power setting 802 based on information received, retrieved and/or otherwise obtained from the engine control system 588. For example, the bleed air regulator 570 determines that the aircraft engine 110 is in a high power setting mode by comparing a speed (e.g., an RPM) of the HPC shaft 224 to a high power setting RPM threshold (e.g., an RPM range or table stored in the database 586). In some examples, the engine control system 588 receives pressure values of bleed air in the engine compressor 216 and determines selection between the first bleed port 242 or the second bleed port 244 based on the measured pressure values. In response to determining that the aircraft engine 110 is in the high power setting 802, the bleed air regulator 570 commands the valve operator 576 to close the second control valve 536 (reducing a pressure in the LPPR passageway 506) to enable the first control valve 534 to open and allow bleed air from the first bleed port 242 to flow to the LPPR passageway 506.

In some examples, the power recovery determiner 572 receives, retrieves or otherwise obtains a measured pressure of the bleed air in the LPPR passageway 506 via the sensor 552 and compares (e.g., via the comparator 582) the measured pressure to a pressure threshold, a target pressure, etc., obtained from the database 586. When the aircraft engine 110 is operating in the high power setting 802, the power recovery determiner 572 determines that the measured pressure exceeds the pressure threshold (e.g., 40 psi) and, thus, determines to activate the power recovery system 202. To activate the power recovery system 202, the power recovery determiner 572 commands the valve operator 576 to open the third control valve 538.

The power recovery operator 574 measures a pressure of the bleed air at the turbine inlet 252 and a pressure of the bleed air at the turbine outlet 254 and adjusts the variable inlet guide vane 320 of the PR turbine 250 to adjust (e.g., increase or decrease) the output power to the HPC shaft 224. Additionally, the power recovery determiner 572 and/or the power recovery operator 574 receive a pressure and/or temperature value of the bleed air from the sensors 560, 562 at the precooler inlet 514. If the pressure and/or temperature at the precooler inlet 514 exceeds a precooler inlet pressure threshold and/or a precooler inlet temperature threshold (e.g., retrieved from the database 586), the valve operator 576 causes the fourth control valve 540 to move to a closed position to prevent bleed air flow through the main manifold 512. If the pressure and/or temperature at the precooler inlet 514 does not exceed a precooler inlet pressure threshold and/or a precooler inlet temperature threshold (e.g., retrieved from the database 586), the valve operator 576 causes the fourth control valve 540 to move to an open position to all bleed air flow through the main manifold 512.

Additionally, the precooler operator 578 receives, retrieves and/or otherwise obtains a measured temperature of the bleed air at the precooler outlet 516 via the sensor 566 and a target temperature for the ECS 236 via the database 586. The precooler operator 578 compares the measured temperature and the target temperature. In this example, the precooler operator 578 determines that the measured temperature does not exceed the target temperature and commands or otherwise causes the actuator 532 to move the precooler valve 530 to the second position to enable bleed air to flow through the precooler bypass 528.

Figure 9:
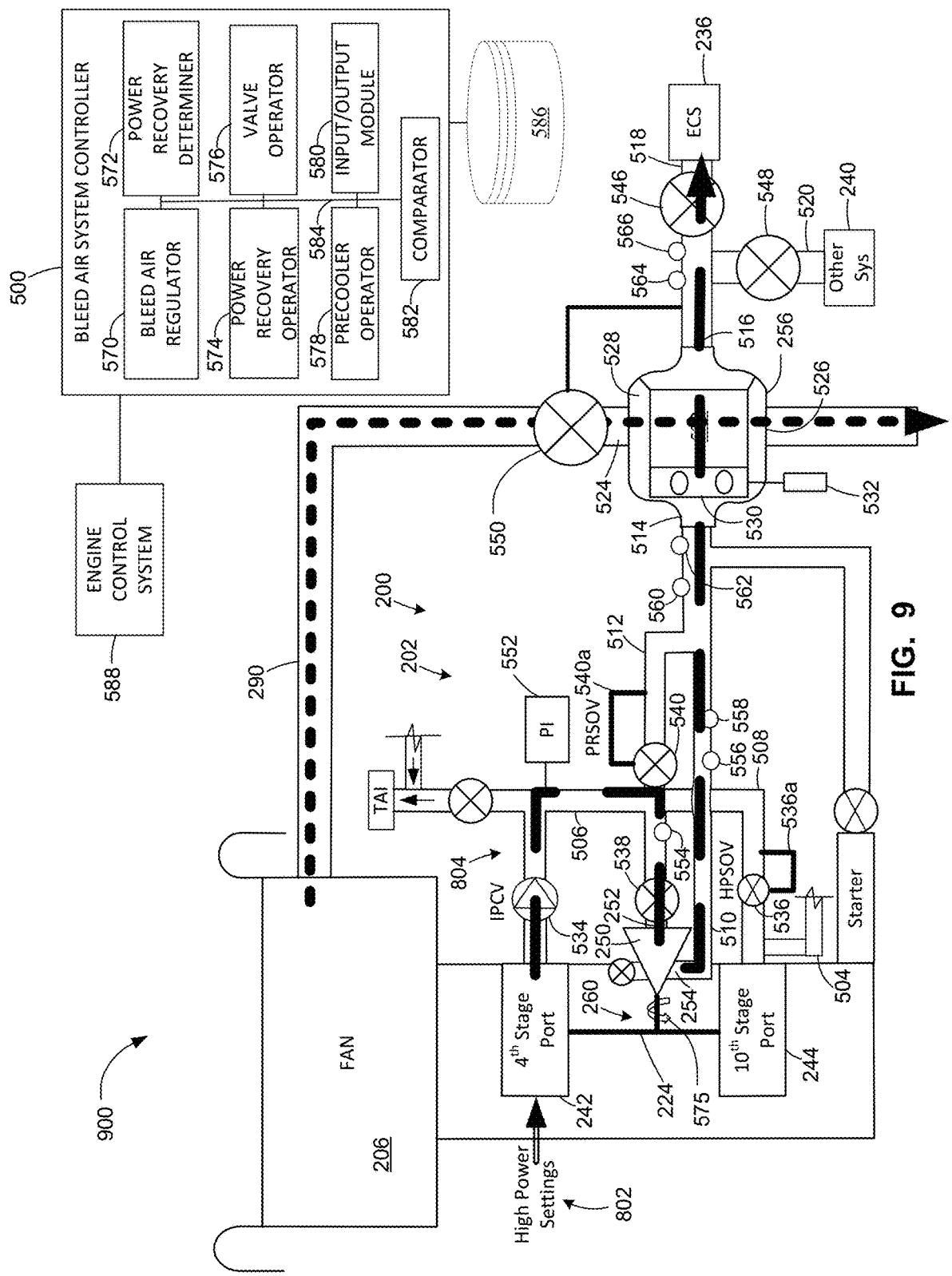

FIG. 9 is a schematic illustration of the bleed air system 200 of FIGS. 1-5 in a fourth mode of operation 900. In the fourth mode of operation 900, the aircraft engine 110 operates in the high power setting 802 and an ambient air temperature is greater than an ambient temperature threshold (e.g., 75 degrees Fahrenheit). The fourth mode of operation 900 is substantially similar to the third mode of operation 800 except that the bleed air is cooled (e.g., a temperature of the bleed air is reduced) via the precooler 256. For example, the precooler operator 578 determines that a measured temperature from the sensor 566 at the precooler outlet 516 exceeds a target temperature. To activate the precooler 256, the precooler operator 578 commands or otherwise causes the actuator 532 to move the precooler valve 530 to the first position to enable bleed air to flow through the heat exchanger portion 522. Additionally, the precooler operator 578 commands or otherwise causes the valve operator 576 to open the fan valve 550 to allow fan air 210a (FIG. 2) to flow from the cooling fluid inlet 524 to the cooling fluid outlet 526 to cool the bleed air flowing through the heat exchanger portion 522. The precooler operator 578 receives a downstream measured temperature from the sensor 566 downstream from the precooler outlet 516 and compares the downstream measured temperature to the target temperature. The precooler operator 578 or valve operator 576 modulates (e.g., opens and/or closes) the fan valve 550 to regulate the downstream measured temperature downstream from the precooler outlet 516 to the target temperature.

Figure 10:
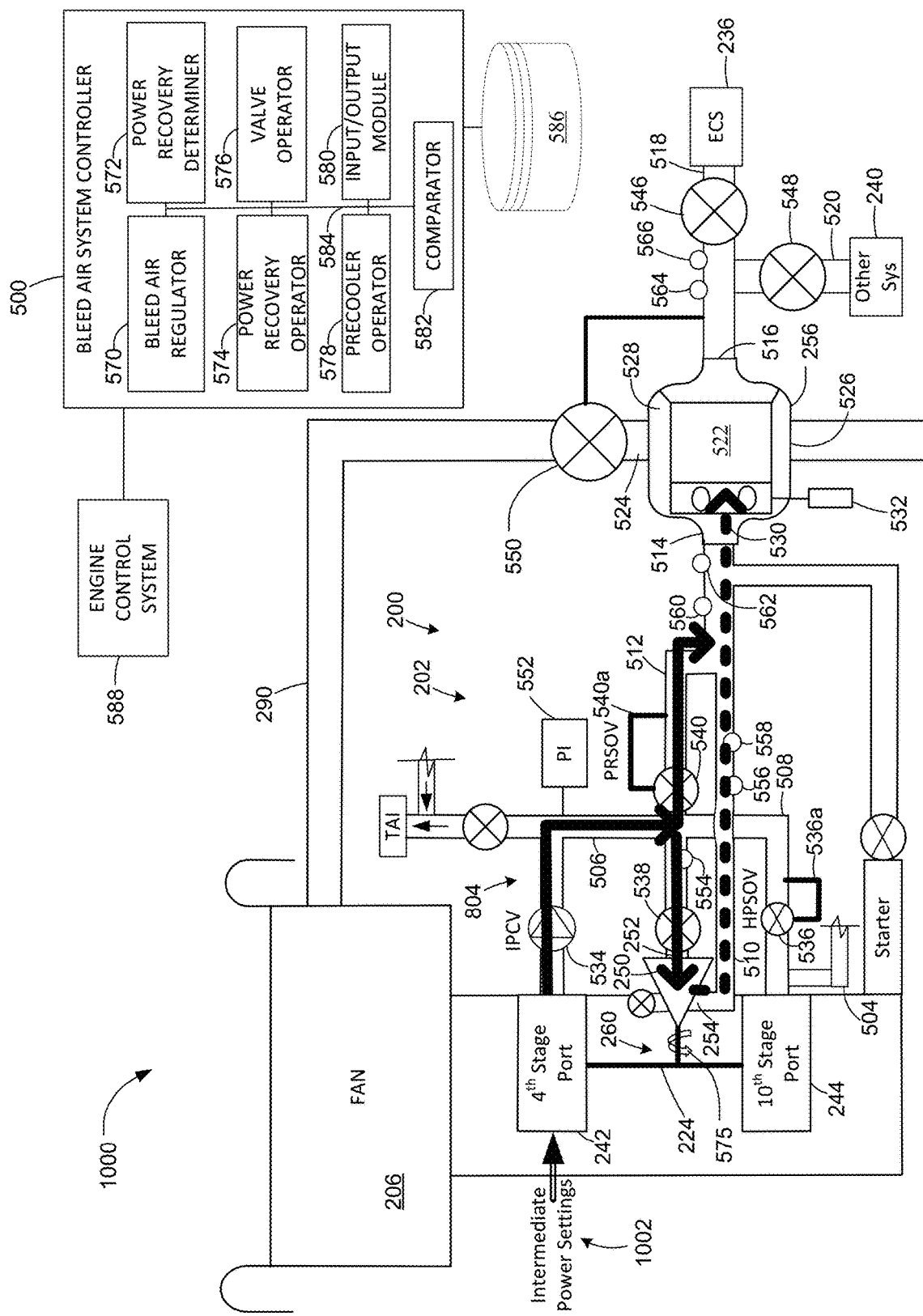

FIG. 10 is a schematic illustration of the bleed air system 200 of FIGS. 1-5 in a fifth mode of operation 1000. In the fifth mode of operation 1000, the aircraft engine 110 operates in a moderate power setting 1002 (e.g., between the low power setting and/or the high power setting 802) and an ambient air temperature is less than an ambient temperature threshold (e.g., 75 degrees Fahrenheit). The fifth mode of operation 1000 is substantially similar to the third mode of operation 800 except that the bleed air exiting the turbine outlet 254 is mixed with bleed air flowing through the main manifold 512. For example, the bleed air provided by the turbine outlet 254 is mixed with the bleed air provided by the main manifold 512 to increase a parameter (e.g., a pressure or temperature) of the bleed air prior to flowing to the precooler inlet 514. For example, the power recovery operator 574 determines that a measured pressured or temperature from the sensors 560, 562 at the precooler inlet 514 does not exceed a target pressure or temperature at the precooler outlet 516. For example, during the moderate power setting 1002, the pressure exiting the turbine outlet 254 may be too low and/or a temperature of the bleed air exiting the turbine outlet 254 is too cold. To activate bleed air flow through the main manifold 512, the valve operator 576 commands or otherwise causes the fourth control valve 540 to move to an open position to allow fluid through the main manifold 512.

Figure 11:
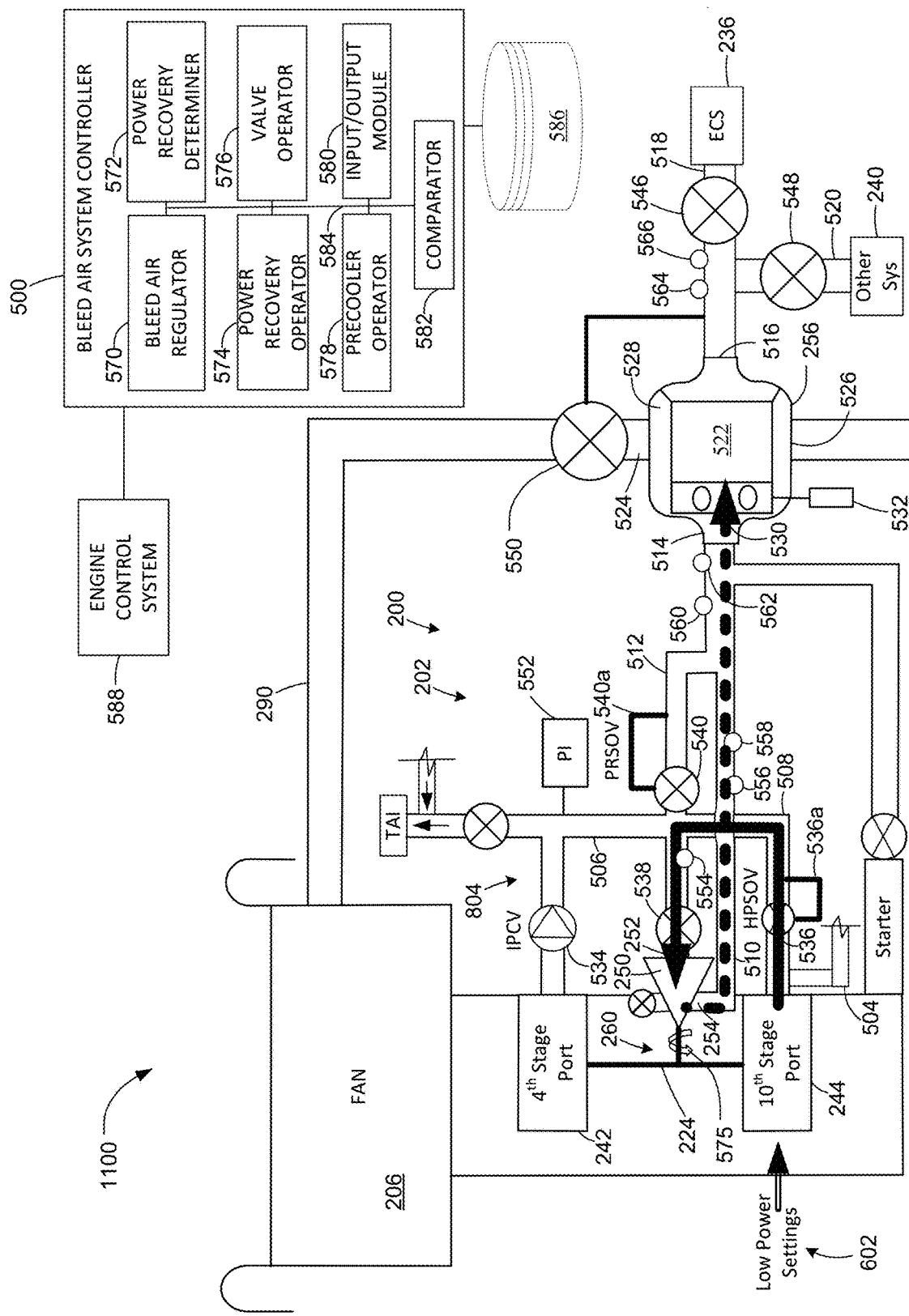

FIG. 11 is a schematic illustration of the bleed air system 200 of FIGS. 1-5 in a sixth mode of operation 1100. In the sixth mode of operation 1100, the aircraft engine 110 is in a low power setting 602 and the power recovery system 202 is in the activated state 804 and power (e.g., horsepower 575) is generated by the PR turbine 250. For example, in the sixth mode of operation 1100, the power recovery system 202 receives bleed air from the second bleed port 244. For example, bleed air flows from the second bleed port 244 to the turbine inlet 252 via the HPPR passageway 508.

To provide bleed air from the second bleed port 244 to the turbine inlet 252 via the HPPR passageway 508, the bleed air system controller 500 causes the second control valve 536 and the third control valve 538 to move to open positions. The bleed air system controller 500 causes the first control valve 534 and the fourth control valve 540 to move to closed positions to prevent bleed air from flowing from the first bleed port 242 to the turbine inlet 252 via the LPPR passageway 506 or bleed air from flowing through the main manifold 512.

For example, in the sixth mode of operation 1100, the bleed air regulator 570 determines that the aircraft 100 is in the low power setting 602 based on information received, retrieved and/or otherwise obtained from the engine control system 588. In response to determining that the aircraft engine 110 is in the low power setting 602, the bleed air regulator 570 commands the valve operator 576 to open the second control valve 536 to allow bleed air from the second bleed port 244 to flow to the HPPR passageway 508.

Additionally, the power recovery determiner 572 receives, retrieves or otherwise obtains a measured pressure and/or a measured temperature of the bleed air in the HPPR passageway 508 via the sensors 552, 554 and compares (e.g., via the comparator 582) the measured pressure to a pressure threshold and/or the measured temperature to a temperature threshold obtained from the database 586. If the power recovery determiner 572 determines that the measured pressure exceeds the pressure threshold (e.g., 40 psi) and/or the measured temperature exceeds the temperature threshold, the power recovery determiner 572 determines to activate the power recovery system 202 and commands the valve operator 576 to open the third control valve 538.

The power recovery operator 574 measures a pressure of the bleed air at the turbine inlet 252 and a pressure of the bleed air at the turbine outlet 254. If the change in pressure is greater than a delta pressure threshold retrieved from the database 586, the power recovery operator 574 adjusts the variable inlet guide vane 320 of the PR turbine 250 to increase power to the HPC shaft 224. Additionally, the power recovery determiner 572 and/or the power recovery operator 574 receive a pressure and/or temperature value of the bleed air from the sensors 560, 562 at the precooler inlet 514. If the pressure at the precooler inlet 514 is greater than precooler inlet pressure threshold (e.g., retrieved from the database 586), the valve operator 576 causes the fourth control valve 540 to move to a closed position to prevent bleed air flow through the main manifold 512. If the pressure at the precooler inlet 514 is less than a precooler inlet pressure threshold (e.g., retrieved from the database 586), the valve operator 576 causes the fourth control valve 540 to move to an open position to allow bleed air flow through the main manifold 512.

Additionally, the precooler operator 578 receives, retrieves and/or otherwise obtains a measured temperature of the bleed air at the precooler inlet 514 via the sensor 562 and a target temperature for the ECS 236 via the database 586. The precooler operator 578 compares the measured temperature and the target temperature. The precooler operator 578 commands or otherwise causes the actuator 532 to move the precooler valve 530 to the first position to enable bleed air to flow through the heat exchanger portion 522 and causes the valve operator 576 to open the fan valve 550 when the measured temperature exceeds the target temperature. The precooler operator 578 commands or otherwise causes the actuator 532 to move the precooler valve 530 to the second position to enable bleed air to flow through the precooler bypass 528 when the measured temperature does not exceed the target temperature.

Figure 12:
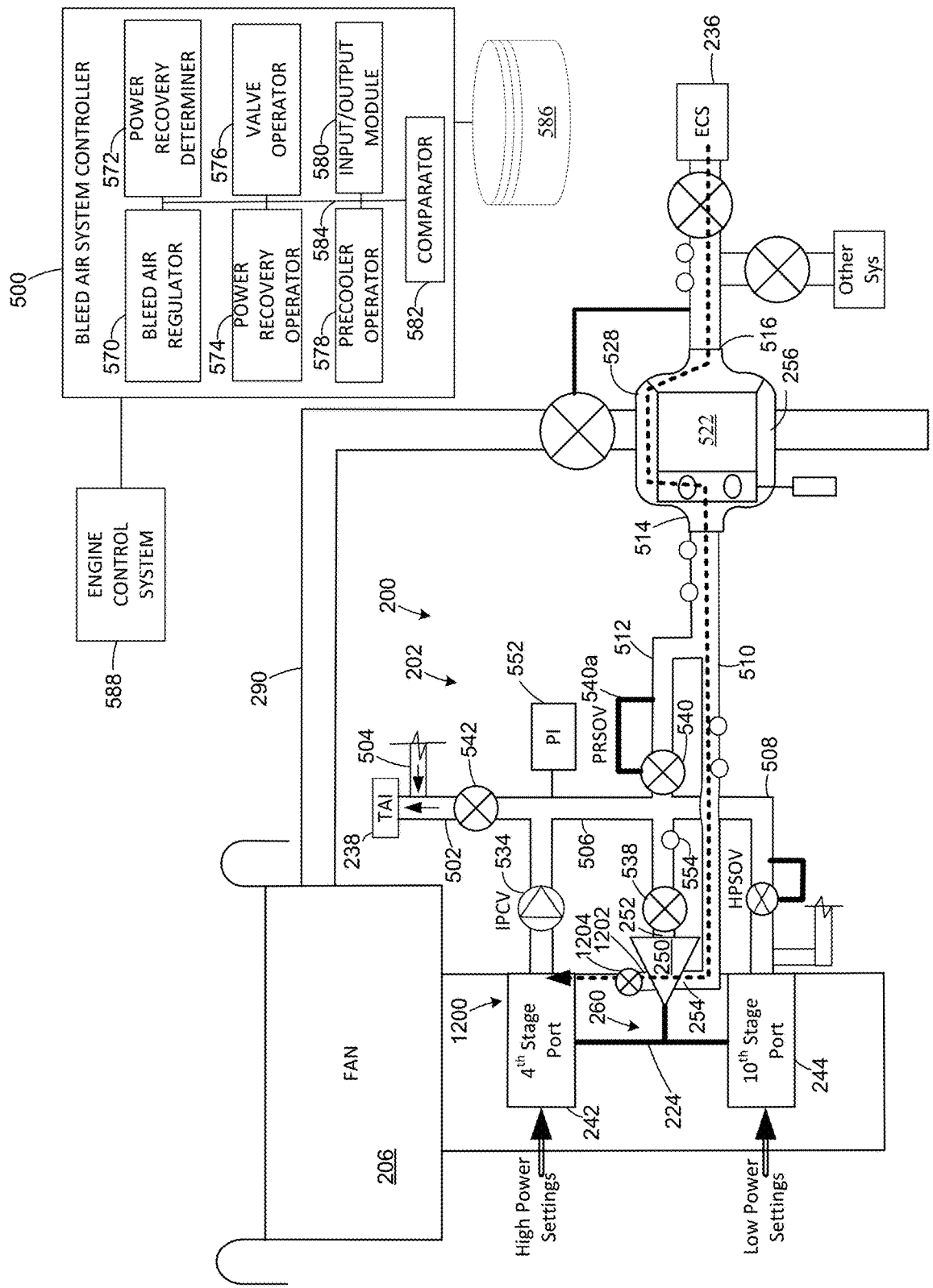
FIG. 12 is a schematic illustration of the example aircraft engine employing the example power recovery system of FIGS. 1-11 as a starter.

FIG. 12 is a schematic illustration of the aircraft engine 110 employing the power recovery system as a starter 1200. For example, the starter 567 of the aircraft engine 110 of FIG. 5 can be omitted or replaced with the power recovery system 202. In some examples, the power recovery system 202 can provide a starter backup system for the starter 567 of FIG. 5. To employ the power recovery system 202 as the starter 1200, pressurized fluid is provided at the precooler outlet 516 via an auxiliary unit (e.g., external to the aircraft 100). The pressurized fluid flows to the precooler inlet 514 (e.g., via the precooler bypass 528) and to the turbine outlet 254 via the PR manifold 510. The fluid flows through the PR turbine 250 and exits via an exhaust port 1202 controlled by an exhaust valve 1204 (e.g., a shut-off valve). The exhaust port 1202 provides an auxiliary outlet when the exhaust valve 1204 is in an open position to allow airflow in the PR turbine 250 to exhaust via the exhaust port 1202. The first control valve 534, the second control valve 536, the third control valve 538, and the fourth control valve 540 are in respective closed positions when the PR turbine 250 operates as a starter.

Figure 13:
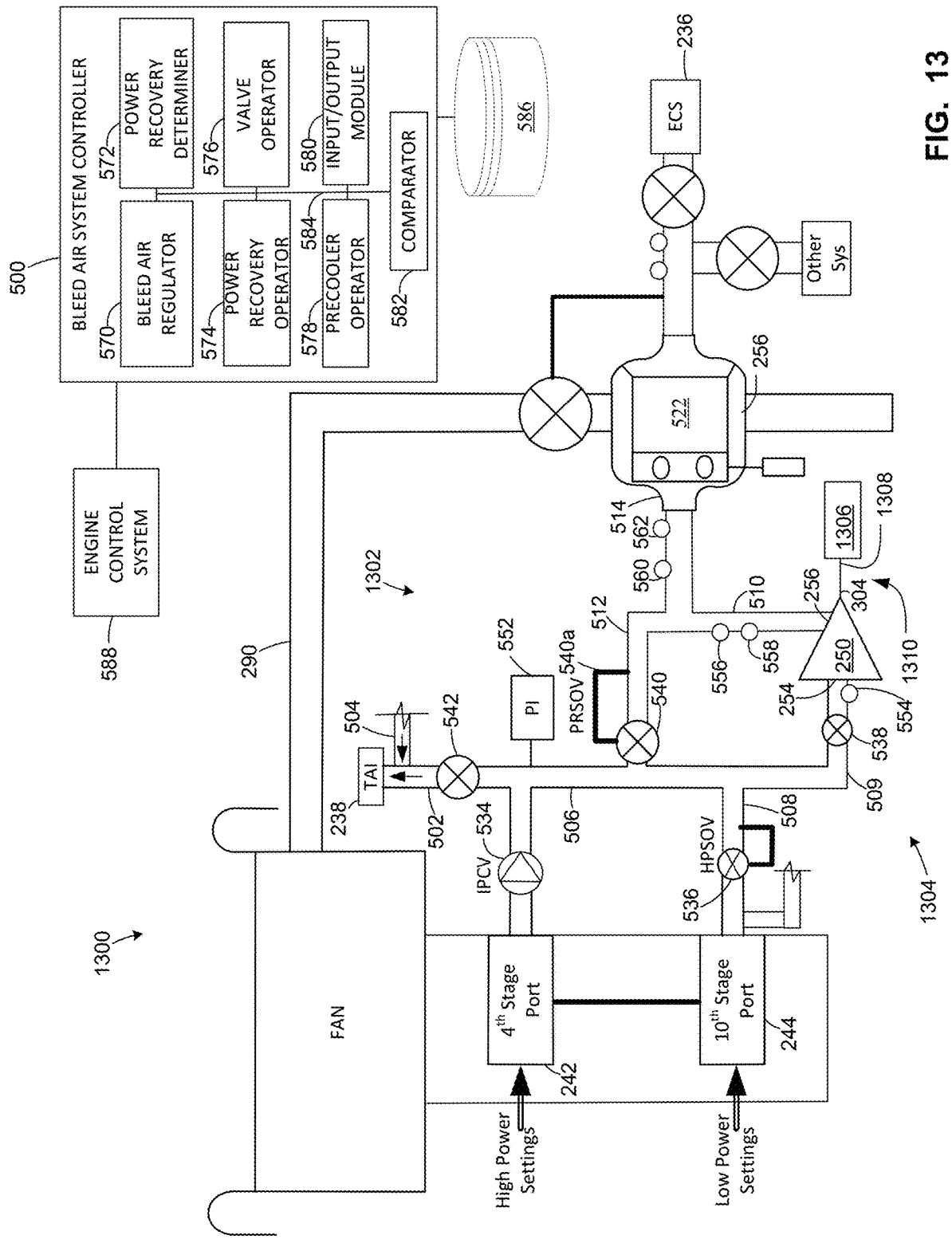
FIG. 13 is a schematic illustration of an example aircraft engine having another example power recovery system disclosed herein.

FIG. 13 is a schematic illustration of the aircraft engine 110 and the bleed air system 1302 implemented with another example power recovery system 1304 disclosed herein. Those components of the example aircraft engine 1300, the bleed air system 1302 and power recovery system 1032 that are substantially similar or identical to the components of the example aircraft engine 110, the bleed air system 200 and the power recovery system 200 described above in connection with FIGS. 1-12 and that have functions substantially similar or identical to the functions of those components will not be described in detail again below. Instead, the interested reader is referred to the above corresponding descriptions. To facilitate this process, similar reference numbers will be used for like structures. For example, the aircraft engine 1300 is substantially identical to the aircraft engine 110 and includes a fan 206, a first bleed port 242, a second bleed port 244, an ECS, 236, a TAI 238, a precooler 256, etc.

For example, the bleed air system 1300 is substantially identical to the bleed air system 200 and includes a first TAI passageway 502, a second TAI passageway 504, a low-pressure power recovery (LPPR) passageway 506, a high-pressure power recovery (HPPR) passageway 508, a PR passageway 509, a power recovery (PR) manifold 510, a main manifold 512, a precooler inlet 514, a precooler outlet 516, a first control valve 534, a second control valve 536, a third control valve 538, a fourth control valve 540, a fifth control valve 542, a sixth control valve 546, a seventh control valve 548, one or more sensors 552-566, a bleed air system controller 500 including a bleed air regulator 570, a power recovery determiner 572, a power recovery operator 574, a valve operator 576, a precooler operator 578, an input/output (I/O) module 580, and a comparator 582 communicatively coupled via a bus 584, etc.

For example, the power recovery system 1304 is substantially similar to the power recover system 202 of FIGS. 2-12 and includes a power recovery (PR) turbine 250 that receives bleed air via a turbine inlet 252 (i.e., a bleed air inlet) and exhausts bleed air via a turbine outlet 254 (e.g., a bleed air outlet) to a precooler 256 (e.g., a heat exchanger). The LPPR passageway 506 fluidly couples the first bleed port 242 and the turbine inlet 252 and the HPPR passageway 508 fluidly couples the second bleed port 244 and the turbine inlet 252. The PR passageway 509 fluidly couples the LPPR 506 and the HPPR 508 to the turbine inlet 252. The power recovery (PR) manifold 510 fluidly couples the turbine outlet 254 and the precooler 256. The main manifold 512 is fluidly coupled to the first bleed port 242 via the LPPR passageway 506 and is fluidly coupled to the second bleed port 244 via the HPPR passageway 508. The precooler 256 includes a precooler inlet 514 to receive bleed air from the PR manifold 510 and/or the main manifold 512 and a precooler outlet 516 fluidly coupled to the ECS 236 via an ECS passageway 518 and the other systems 240 via an auxiliary passageway 520.

The PR turbine 250 of the power recover system 1304 is operatively (e.g., mechanically) coupled to an auxiliary power device or machine 1306. The auxiliary power device 1306 is a shaft-driven device or machine. In other words, the auxiliary power device 1306 absorbs power provided via an input shaft of the power absorbing machine. The PR output shaft 304 (FIG. 3) transfers power to an input shaft 1308 (e.g., a driven shaft, a generator shaft, etc.) of the auxiliary power device 1306. In other words, the input shaft 1308 receives power from the output shaft 304 of the PR turbine 250 (e.g., when the power recovery system 1304 is in an activated state). The PR turbine 250 can be operatively coupled to the auxiliary device 1306 via a transmission 1310. For example, the transmission 1310 can include a gearbox (e.g., the gearbox 306 of FIG. 3), a gear train (e.g., the gear train 310 of FIG. 3), a clutch (e.g., the clutch 318 of FIG. 3) and/or any other transmission (e.g., fixed gear ratio transmission, a continuous variable transmission, etc.). The auxiliary power device 1306 can include, for example, a generator (e.g., a generator or alternator used to produce electricity), a compressor, a turbine, auxiliary power unit (APU) and/or any other shaft driven device that can receive or use energy from the PR turbine 250. The auxiliary power device 1306 can be located in a nacelle of the aircraft engine 1300, a wingbox of a wing, a fuselage of the aircraft, and/or any other location. The LPPR 506, the HPPR 508, the PR passageway 509 and the power recovery (PR) manifold 510 can be routed to the location of the PR turbine 250.

In operation, the aircraft engine 1300, the bleed air system 1302 and the power recovery system 1304 operate substantially similar to the operation of the aircraft engine 110, the bleed air system 200 and the power recovery system 202 of FIGS. 1-12. For example, the power recovery system 1304, via the controller 500 of the bleed air system 1302, extracts or harvests energy from the engine bleed air. Specifically, the PR turbine 250 generates power when processing the bleed air from the turbine inlet 252 to the turbine outlet 254 and transfers the generated power to the auxiliary power device 1302 of an aircraft (e.g., the aircraft 100 of FIG. 1). For example, the PR turbine 250 extracts or harvests energy by reducing one or more parameters (e.g., temperature, pressure, etc.) from the bleed air as the bleed air flows between the turbine inlet 252 and the turbine outlet 254. The energy extracted from the bleed air is converted into power (e.g., shaft horsepower) and transferred (e.g., fed back) into the auxiliary power device 1306 by the PR turbine 250. In some examples, the power recovery system 1304 extracts energy from the bleed air during a predetermined operating state of the aircraft (e.g., taxiing, takeoff, climb, cruise, descent, landing, etc.). Further details of the operation of the bleed air system 1304 is not further described and the interested reader can refer to the description of FIGS. 1-12 and FIG. 14.

The foregoing examples of the power recover systems 202 and 1304 can be employed with an aircraft and/or aircraft engine. Although each example power recover systems disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. For example, an aircraft engine can employ one or more power recovery systems 202 and 1304. In some examples, the aircraft engine can employ the power recovery system 202 and the power recovery system 1304. In some examples, the aircraft engine 1300 can be used as a starter (e.g., the starter 1200 of FIG. 12).

Figure 14:
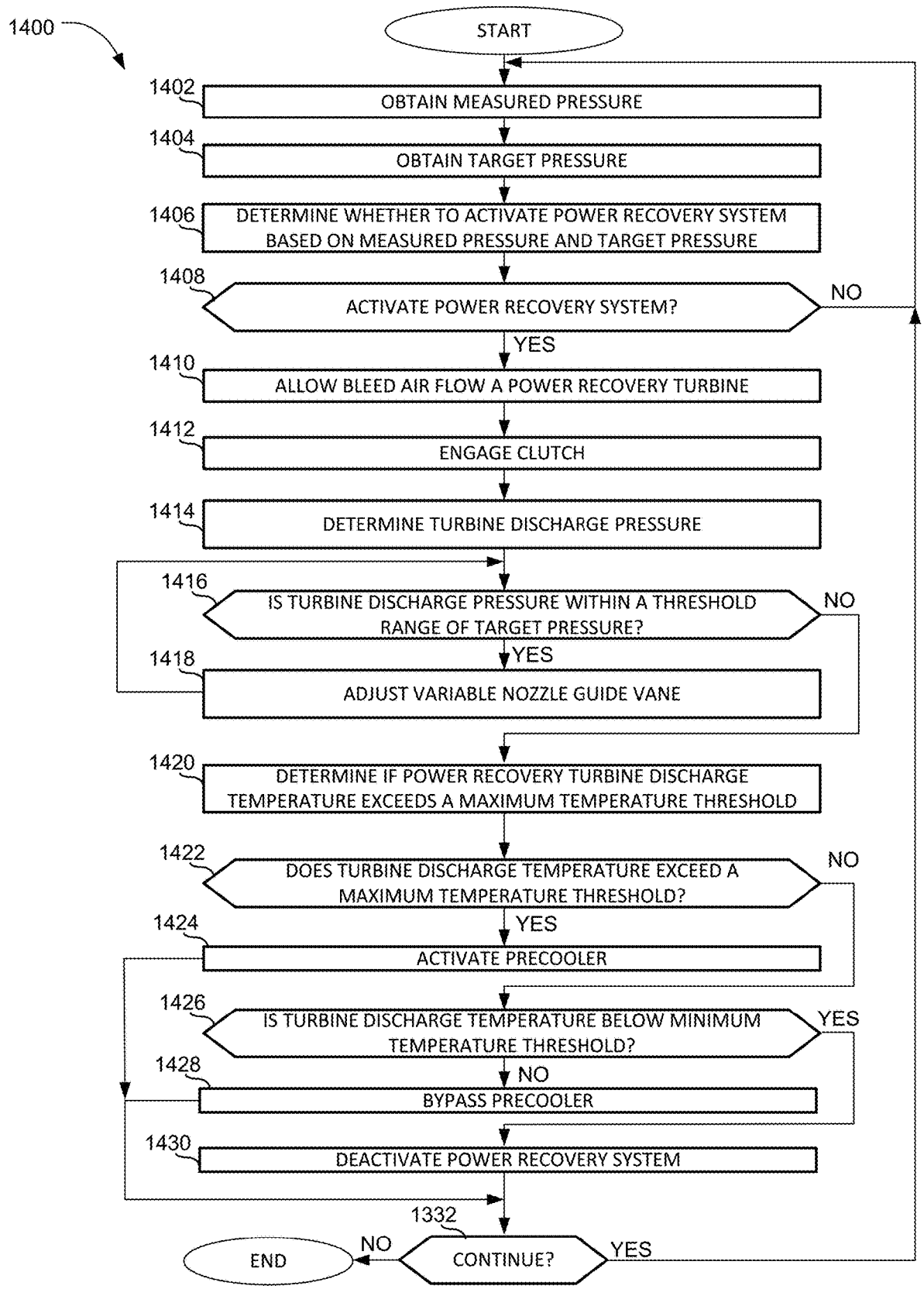
FIG. 14 is a flowchart representative of an example method that may be performed by the example bleed air system of FIGS. 1-13.
Figure 15:
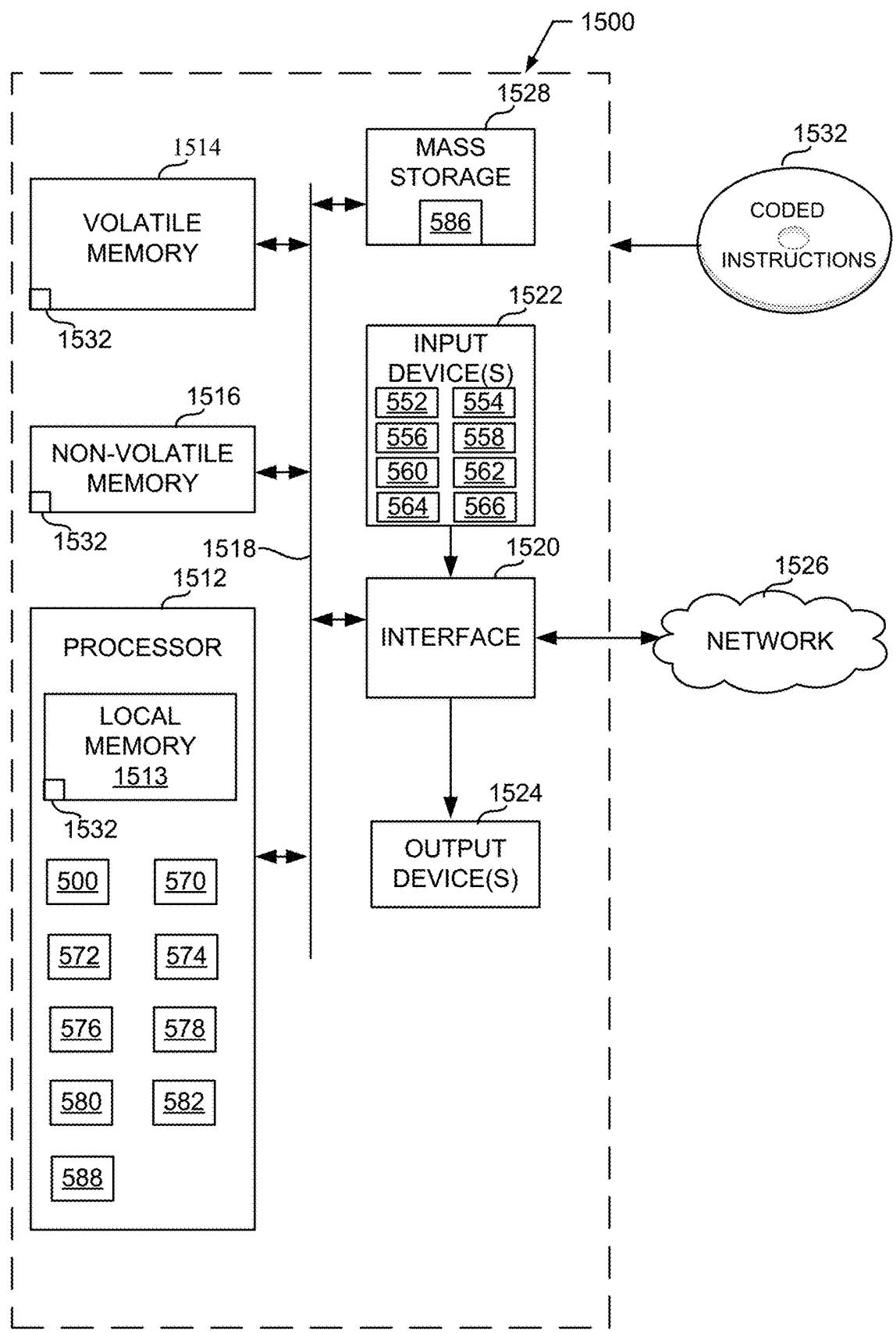
FIG. 15 is a block diagram of an example processing platform structured to execute the instructions of FIG. 14 to implement an example bleed air system controller of the example bleed air system of FIGS. 1-13.

FIG. 14 is a flowchart representative of an example method 1400 that may be implemented with the bleed air system 200 of FIG. 2, the bleed air system 1302 of FIG. 13 and/or a control system such as the bleed air system controller 500 of FIGS. 5-13. For purposes of discussion, the example method 1400 of FIG. 14 is described in connection with the bleed air system 200 of FIGS. 2-12, the bleed air system 1302 of FIG. 13 and the bleed air system controller 500 of FIGS. 5-13. In this manner, each of the example operations of the example method 1400 of FIG. 15 is an example manner of implementing a corresponding one or more operations performed by one or more of the blocks of the example bleed air system controller 500 of FIGS. 5-13. In this example, the method may be implemented using machine readable instructions that comprise a program for execution by a processor such as the processor 1500 shown in FIG. 15. The machine readable instructions may be one or more executable programs or portion(s) of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 14, many other methods of implementing the example bleed air system controller 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example method of FIG. 13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Turning in detail to FIG. 14, the bleed air system controller 500 monitors, receives and/or otherwise obtains a measured pressure of bleed air in the bleed air system 200 (block 1402). For example, to monitor a system parameter, the bleed air system controller 500 receives one or more signals from the sensor 552 via the I/O module 580.

The bleed air system controller 500 retrieves, receives and/or otherwise obtains a target pressure (block 1404). For example, the bleed air regulator 570 retrieves a target pressure from the database 586.

The bleed air system controller 500 determines whether to activate the power recovery system 202 based on the measured pressure and the target pressure (block 1406). In some examples, to determine whether to activate the power recovery system 202, the power recovery determiner 572 determines, via the comparator 582, if the measured pressure is greater than the target pressure to determine if the PR turbine 250 is capable of adding power (e.g., horsepower 575) to the HPC shaft 224 (block 1404). For example, the power recovery determiner 572 determines if the PR turbine 250 is capable of adding power to the HPC shaft 224 and achieve a minimum ECS pressure based on a turbine performance map (e.g., retrieved from the database 586), a measured speed (e.g., an RPM) of the HPC shaft 224, and the measured pressure from the sensor 552. In some examples, the PR turbine 250 determines a pressure differential between the pressure at the turbine inlet 252 and the pressure of the turbine outlet 254 to determine if the pressure differential is sufficient to provide required mass flow rate to the ECS 236. In some examples, to determine whether to activate the power recovery system 1304, the power recovery determiner 572 determines, via the comparator 582, if the measured pressure is greater than the target pressure to determine if the PR turbine 250 is capable of adding power (e.g., horsepower 575) to the auxiliary power device 1306 (block 1404). For example, the power recovery determiner 572 determines if the PR turbine 250 is capable of adding power to the auxiliary power device 1306 and achieve a minimum ECS pressure based on a turbine performance map (e.g., retrieved from the database 586) and the measured pressure from the sensor 552. In some examples, to determine whether to activate the power recovery system 202 or the power recovery system 1304, the power recovery determiner 572 determines if the PR turbine 250 is capable of providing a minimum ECS pressure based on a turbine performance map (e.g., retrieved from the database 586) and the measured pressure from the sensor 552.

If the bleed air system controller 500 determines not to activate the power recovery system 202 or the power recovery system 1302 (block 1408), the bleed air system controller 500 prevents bleed air from flowing to the PR turbine 250 (block 1408). For example, the power recovery determiner 572 and/or the valve operator 576 causes the third control valve 538 to move to the closed position. In some examples, the power recovery determiner 572 determines not activate the power recovery system 202 in response to determining that the PR turbine 250 cannot add power to the HPC shaft 224 or the auxiliary power device 1306. In some examples, the power recovery determiner 572 determines not activate the power recovery system 202 or the power recovery system 1304 if the PR turbine 250 is not capable of providing a minimum ECS pressure based on a turbine performance map (e.g., retrieved from the database 586) and the measured pressure from the sensor 552.

If at block 1408 the bleed air system controller 500 determines to activate the power recovery system 202 or the power recovery system 1304, the bleed air system controller 500 allows bleed air to flow to the PR turbine 250 (block 1410). For example, the power recovery determiner 572 and/or the valve operator 576 causes the third control valve 538 to move to the open position to allow bleed air to flow to the turbine inlet 252. In some examples, the power recovery determiner 572 determines to activate the power recovery system 202 in response to determining that the PR turbine 250 can add power to the HPC shaft 224. In some examples, the power recovery determiner 572 determines to activate the power recovery system 1304 in response to determining that the PR turbine 250 can add power to the auxiliary power device 1306.

The bleed air system controller 500 engages the clutch 318 (block 1412). For example, the power recovery operator 574 regulates (e.g., adjusts) the variable inlet guide vanes 320 to increase an output speed of the PR turbine 250 to engage the clutch 318.

The bleed air system controller 500 determines a turbine discharge pressure at the turbine outlet 254 (block 1414). For example, the power recovery determiner 572 compares a measured pressure of the bleed air from the sensor 556 and a target pressure retrieved from the database 586. Based on the comparison between the measured pressure and the target pressure, the bleed air system controller 500 determines if the turbine discharge pressure is within a threshold range of the target pressure (block 1416). If at block 1416 the discharge pressure is within the threshold range at block 1416, the power recovery operator 574 adjusts (e.g., increases or decreases) an output torque of the PR turbine 250 by adjusting (e.g., increasing or decreasing) the variable inlet guide vanes 320 (block 1418).

If at block 1416 the bleed air system controller 500 determines that the turbine discharge pressure is not within a threshold range of the target pressure, the bleed air system controller 500 determines if the power recovery turbine discharge temperature at the turbine outlet 254 exceeds a maximum temperature threshold (block 1420). For example, bleed air system 200 measures the discharge temperature of the bleed air at the turbine outlet 254 and compares, via the comparator 582, the measured temperature to a maximum temperature threshold or range.

The bleed air system controller 500 determines if the turbine discharge temperature exceeds a maximum temperature threshold (block 1422). If at block 1422 the bleed air system controller 500 determines that the turbine discharge temperature exceeds the maximum temperature threshold, the bleed air system controller 500 activates the precooler 256 (block 1424). For example, the precooler operator 578 measures a temperature of the bleed air at the precooler outlet 516 via the sensor 566 and compares the measured temperature to a target temperature or range. For example, the precooler operator 578 and/or the valve operator 576 causes the actuator 532 to move the precooler valve 530 to the first position to allow bleed air to flow through the heat exchanger portion 522 and commands the fan valve 550 to move to the open position to allow cooling fluid through the precooler 256 to flow between the cooling fluid inlet 524 and the cooling fluid outlet 526. For example, the precooler operator 578 modulates the fan valve 550 so that the bleed air at the precooler outlet 516 is within a target temperature threshold.

If at block 1422 the bleed air system controller 500 determines that the turbine discharge temperature does not exceed the maximum temperature threshold, the bleed air system controller 500 determines if the discharge temperature is below a minimum temperature threshold (block 1426). If at block 1426 the discharge temperature is not below the minimum temperature threshold, the bleed air system controller 500 causes the bleed air to flow through the precooler bypass 528 (block 1428). If at block 1426 the bleed air system controller 500 determines that the turbine discharge temperature is below a minimum temperature threshold, the bleed air system controller 500 deactivates the power recovery system 202 (block 1430). For example, the power recovery operator 574 causes the third control valve 538 to move to the closed position to prevent bleed air flow to the turbine inlet 252.

In some examples, the bleed air system controller 500 determines whether to persist and/or otherwise continue monitoring the power recovery system 202 or the power recovery system 1304 (block 1432). For example, the bleed air system controller 500 may determine to discontinue monitoring the power recovery system 202 or the power recovery system 1304 based on a user input, receiving continuing communication (e.g., a communication heartbeat signal, sensor information, etc.) from a sensor communicatively coupled to the bleed air system 200, if the aircraft engine 110 is operating, etc.

FIG. 15 is a block diagram of an example processor platform 1500 structured to execute the instructions of FIG. 13 to implement the bleed air system controller 500 of FIG. 5. The processor platform 1500 can be, for example, a server, a personal computer, a workstation, a self-learning machine (e.g., a neural network), a mobile device (e.g., a cell phone, a smart phone, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the bleed air regulator 570, the power recovery determiner 572, the power recovery operator 574, the valve operator 576, the precooler operator 578, the comparator 582, and the I/O module 580.

The processor 1512 of the illustrated example includes a local memory 1513 (e.g., a cache). The processor 1512 of the illustrated example is in communication with a primary memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the primary memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 14 may be stored in the mass storage device 1528, in the volatile memory 1414, in the non-volatile memory 1516, and/or on a removable non-transitory computer readable storage medium such as a CD or DVD.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

At least some of the aforementioned examples include one or more features and/or benefits including, but not limited to, the following:

In some examples, a power recovery system for an aircraft engine includes a power recovery turbine coupled to a shaft-driven device. A bleed air valve coupled between the power recovery turbine and a bleed air source. A controller configured to operate the bleed air valve to allow bleed air to flow to the power recovery turbine when the aircraft engine operates in a predetermined mode of operation.

In some examples, shaft-driven device is a core engine of the aircraft, the core engine including a core compressor, a core turbine, and a core shaft, the power recovery turbine being operatively coupled to the core shaft of the core engine.

In some examples, an output shaft of the power recovery turbine is operatively coupled to the core shaft via a transmission.

In some examples, the transmission includes a clutch coupled between the power recovery turbine and the core engine, the clutch configured to operatively couple the output shaft and the core shaft when the aircraft engine operates in the predetermined mode of operation and operatively decouple the output shaft and the core shaft when the aircraft engine does not operate in the predetermined mode of operation.

In some examples, the shaft-driven device is a generator having an input shaft, where an output shaft of the power recovery turbine is coupled to an input shaft of the generator.

In some examples, the predetermined mode of operation includes at least one of takeoff, climb, descent, landing or cruise.

In some examples, the power recovery turbine includes a turbine inlet and a turbine outlet, the turbine inlet fluidly coupled to the bleed air source and the turbine outlet being fluidly coupled to a heat exchanger.

In some examples, the power recovery turbine includes a variable nozzle guide vane, the controller configured to modulate the variable nozzle guide vane to regulate a discharge pressure of the bleed air at the turbine outlet.

In some examples, a power recovery system includes a power recovery turbine having: a bleed air inlet to receive bleed air from a bleed air source; a bleed air outlet to provide the bleed air to a downstream system; and an output shaft operatively coupled to an input shaft of a shaft-driven device of the aircraft. The power recovery turbine to generate power in response to processing the bleed air as the bleed air flows from the bleed air inlet to the bleed air outlet, the power recovery turbine to transfer the generated power to the input shaft via the output shaft.

In some examples, a transmission to couple the output shaft of the power recovery turbine and the input shaft of the shaft-driven device.

In some examples, the transmission includes a clutch to engage the output shaft of the power recovery turbine and the input shaft of the shaft-driven device and disengage the output shaft of the power recovery and the input shaft of the shaft-driven device.

In some examples, the transmission includes a multi-speed gearbox to reduce a speed of the output shaft of the power recovery turbine to a speed of the input shaft when the power recovery turbine is engaged with the shaft-driven device.

In some examples, a precooler in fluid communication with the bleed air outlet of the power recovery turbine.

In some examples, a bleed air valve movable between an open position to allow bleed air to flow to the bleed air inlet of the power recovery turbine and a closed position to prevent bleed air from flowing to the bleed air inlet.

In some examples, a controller to control operation of the bleed air valve between the open position and the closed position.

In some examples, the power recovery turbine includes a variable nozzle guide vane, wherein a discharge pressure of bleed air at the bleed air outlet is regulated by modulating the variable nozzle guide vane.

An example aircraft includes an aircraft engine having a core compressor to generate compressed air and a core turbine to drive the core compressor. A power recovery turbine is operatively coupled to the aircraft engine. The power recovery turbine has a turbine inlet in fluid communication with a bleed air supply source provided by the core compressor and a turbine outlet in fluid communication with a downstream system of the aircraft. The power recovery turbine to generate power when processing bleed air from the turbine inlet to the turbine outlet and transfer the generated power to the core compressor of the aircraft engine.

In some examples, the power recovery turbine is located within the aircraft engine.

In some examples, the precooler is located upstream from the power recovery turbine.

In some examples, a bleed air control valve to control bleed air flow from the bleed air supply source to the turbine inlet.

In some examples, a controller communicatively coupled to the bleed air control valve, the controller is configured to cause the bleed air control valve to move between an open position to allow bleed air flow to the turbine inlet and a closed position to prevent bleed air flow to the turbine inlet.

In some examples, the power recovery turbine includes a variable nozzle guide vane, wherein a discharge pressure of bleed air at the turbine outlet is regulated by modulating the variable nozzle guide vane.

In some examples, the power recovery turbine can be mechanically or operatively coupled to a shaft-driven power device to receive power generated by the power recovery turbine to drive an input shaft of the shaft-driven power device.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A power recovery system for an aircraft engine comprising:
    a power recovery turbine coupled to a shaft-driven device, the power recovery turbine including:
        a turbine inlet fluidly coupled to a bleed air source; and
        a turbine outlet;
    a bleed air valve coupled between the power recovery turbine and the bleed air source;
    a controller configured to operate the bleed air valve to allow bleed air to flow to the power recovery turbine when the aircraft engine operates in a predetermined mode of operation; and
    a heat exchanger fluidly coupled to the turbine outlet, the heat exchanger to receive bleed air from the turbine outlet and provide the bleed air to a downstream system, the controller configured to operate the heat exchanger to reduce a temperature of the bleed air from the turbine outlet in response to a determination that a temperature of the bleed air from the turbine outlet is greater than a temperature threshold.

2. The system as defined in claim 1, wherein the shaft-driven device is a core engine of the aircraft, the core engine including a core compressor, a core turbine, and a core shaft of the aircraft engine, the power recovery turbine being operatively coupled to the core shaft of the core engine.

3. The system as defined in claim 2, wherein an output shaft of the power recovery turbine is operatively coupled to the core shaft via a transmission.

4. The system as defined in claim 3, wherein the transmission includes a clutch coupled between the power recovery turbine and the core engine, the clutch configured to operatively couple the output shaft and the core shaft when the aircraft engine operates in the predetermined mode of operation and operatively decouple the output shaft and the core shaft when the aircraft engine does not operate in the predetermined mode of operation.

5. The system as defined in claim 1, wherein the shaft-driven device is a generator having an input shaft, wherein an output shaft of the power recovery turbine is coupled to an input shaft of the generator.

6. The system as defined in claim 1, wherein the predetermined mode of operation includes at least one of takeoff, climb, descent, landing or cruise.

7. The system as defined in claim 1, wherein the power recovery turbine includes a variable nozzle guide vane, the controller configured to modulate the variable nozzle guide vane to regulate a discharge pressure of the bleed air at the turbine outlet.

8. A power recovery system for an aircraft, the system comprising:
    a power recovery turbine having:
        a bleed air inlet to receive bleed air from a bleed air source;
        a bleed air outlet to provide the bleed air to a downstream system; and
        an output shaft operatively coupled to an input shaft of a shaft-driven device of the aircraft, the power recovery turbine to generate power in response to processing the bleed air as the bleed air flows from the bleed air inlet to the bleed air outlet, the power recovery turbine to transfer the generated power to the input shaft via the output shaft; and
    a fluid control system to regulate a fluid characteristic of the bleed air from the bleed air outlet prior to flowing to the downstream system, the fluid control system including a pre-cooler to reduce a temperature of the bleed air from the bleed air outlet when a temperature of the bleed air from the bleed air outlet is greater than a temperature threshold.

9. The system as defined in claim 8, further including a transmission to couple the output shaft of the power recovery turbine and the input shaft of the shaft-driven device.

10. The system as defined in claim 9, wherein the transmission includes a clutch to engage the output shaft of the power recovery turbine and the input shaft of the shaft-driven device and disengage the output shaft of the power recovery turbine and the input shaft of the shaft-driven device.

11. The system as defined in claim 9, wherein the transmission includes a multi-speed gearbox to reduce a speed of the output shaft of the power recovery turbine to a speed of the input shaft when the power recovery turbine is engaged with the shaft-driven device.

12. The system as defined in claim 8, further including a controller configured to operate the precooler in response to a determination that a temperature of the bleed air outlet exceeds the temperature threshold prior to providing the bleed air to the downstream system.

13. The system as defined in claim 8, further including a bleed air valve movable via the control system between an open position to allow bleed air to flow to the bleed air inlet of the power recovery turbine and a closed position to prevent bleed air from flowing to the bleed air inlet.

14. The system as defined in claim 13, wherein the control system includes a controller to control operation of the bleed air valve between the open position and the closed position.

15. The system as defined in claim 8, wherein the power recovery turbine includes a variable nozzle guide vane, wherein a discharge pressure of bleed air at the bleed air outlet is regulated by modulating the variable nozzle guide vane.

16. An aircraft comprising:
an aircraft engine having a core compressor to generate compressed air and a core turbine to drive the core compressor; and
a power recovery turbine operatively coupled to the aircraft engine, the power recovery turbine including:
a turbine inlet in fluid communication with a bleed air supply source provided by the core compressor;
a turbine outlet in fluid communication with a downstream system of the aircraft, the power recovery turbine to generate power when processing bleed air from the turbine inlet to the turbine outlet and transfer the generated power to the core compressor of the aircraft engine; and
a variable nozzle guide vane, wherein a discharge pressure of bleed air at the turbine outlet is regulated by modulating the variable nozzle guide vane;
a precooler downstream from the turbine outlet, the precooler to receive the bleed air from the turbine outlet during operation of the power recovery turbine, the precooler having a heat exchanger and a bypass; and
a control system to:
monitor a discharge pressure and a bleed air temperature of the bleed air at the turbine outlet;
adjust the variable nozzle guide vane during operation to maintain the discharge pressure relative to a discharge pressure threshold;
activate the precooler to enable the bleed air to flow through the heat exchanger to reduce a temperature of the bleed air in response to a determination that the bleed air temperature exceeds a temperature threshold; and
deactivate the precooler to enable the bleed air to flow through the bypass in response to a determination that the bleed air temperature does not exceed the temperature threshold.

17. The aircraft as defined in claim 16, further including a bleed air control valve to control bleed air flow from the bleed air supply source to the turbine inlet.

18. The aircraft as defined in claim 17, further including a controller communicatively coupled to the bleed air control valve, the controller is configured to cause the bleed air control valve to move between an open position to allow bleed air flow to the turbine inlet and a closed position to prevent bleed air flow to the turbine inlet.

19. The aircraft as defined in claim 16, wherein the power recovery turbine includes a variable nozzle guide vane, wherein a discharge pressure of bleed air at the turbine outlet is regulated by modulating the variable nozzle guide vane.

* * * * *